United States Patent [19]

Kizu

[11] Patent Number: 5,333,082
[45] Date of Patent: Jul. 26, 1994

[54] VIDEO SIGNAL RECORDING/REPRODUCING APPARATUS

[75] Inventor: Shigeo Kizu, Tokyo, Japan

[73] Assignee: Kabushiki Kaisha Toshiba, Kawasaki, Japan

[21] Appl. No.: 928,125

[22] Filed: Aug. 11, 1992

Related U.S. Application Data

[63] Continuation-in-part of Ser. No. 400,144, Aug. 29, 1989, abandoned.

[30] Foreign Application Priority Data

Aug. 30, 1988 [JP] Japan ................... 63-215606

[51] Int. Cl.⁵ ................. G11B 21/04; G11B 5/09; G11B 27/02
[52] U.S. Cl. ..................... 360/70; 360/13; 360/53
[58] Field of Search .......... 360/70, 75, 13, 14.1-14.3, 360/36.1, 36.2, 26, 77.15, 77.16, 53; 358/311, 337, 343, 320, 321, 323, 324, 326, 338, 339

[56] References Cited

U.S. PATENT DOCUMENTS

| | | | |
|---|---|---|---|
| 3,742,132 | 6/1973 | Sanguu et al. | 360/36.1 |
| 4,689,706 | 8/1987 | O'Gwynn | 360/14.2 |
| 4,752,832 | 6/1988 | Higurashi | 360/19.1 |

Primary Examiner—Aristotelis Psitos
Assistant Examiner—Varsha V. Sheladia
Attorney, Agent, or Firm—Oblon, Spivak, McClelland, Maier & Neustadt

[57] ABSTRACT

A video signal recording/reproducing apparatus is provided a rotary drum, recording and reproducing heads. Synchronous separation units separate vertical synchronous signals from input and reproduced signals. A memory stores a time difference which represents an elapsed time between when the recording and reproducing heads pass a given location. The time difference stored in the memory is used to control the rotation of the rotary drum.

30 Claims, 14 Drawing Sheets

VIDEO SIGNAL RECORDING/REPRODUCING APPARATUS

This application is a continuation-in-part of the application Ser. No. 07/400,144 filed on Aug. 29, 1989 now abandoned.

BACKGROUND OF THE INVENTION

The present invention relates to a video signal recording/reproducing apparatus, and more particularly to a video signal recording/reproducing apparatus having an electronic editing function.

In producing a program using a video signal recording/reproducing apparatus, particularly in the fields of broadcasting, advertising and education tape editing is an important, and sometimes indispensable work. In present video signal recording/reproducing apparatus for business use, it is typical to use a rotary head type video tape recorder (VTR) for effecting data recording/reproducing on a magnetic tape by video heads provided on the circumference of a rotary drum. Most of these VTRs have an editing function.

The editing operation in a video tape recorder has been called "electronic Edit". This electronic editing operation is carried out in principle by erasing portions of video and audio signals, which have already been recorded on a magnetic tape, and then recording new video and audio signals on the erased region of the magnetic tape.

If the editing is performed as described above, discontinuity of signals takes place principally before and after the editing start point. In particular, phase discontinuity of the video signals causes disturbance of synchronization and deteriorates the quality of a video image. In order to reduce the phase discontinuity that is caused editing, business using VTRs having the editing function use a method to servo-control the rotation phase of the VTRs rotary drum so that the phase of a vertical synchronous signal of video signals reproduced by a recording head during the reproducing period before the editing start point substantially coincides with the phase of a vertical synchronous signal of the input video signals to be recorded during editing.

The timing of the video signals reproduced by the recording heads indicates the rotating phase of the recording heads. If the rotation phase of the rotary drum is servo-controlled so that phases of the vertical synchronous signals from video signals reproduced by the recording heads during the reproducing period before the editing start point become almost the same as that of the vertical synchronous signals separated from input video signals, the phases of signals recorded on a magnetic tape before the editing start point and these of signals newly recorded after the editing start point become substantially the same. Therefore, it becomes possible to minimize the disturbance of video images before and after the editing start point during reproduction.

The method described above is effective on a VTR that is reproducing signals using the recording heads. However, this method is not applicable to such a VTR that is not able to reproduce signals with the recording heads, that is, a type of VTR which has recording heads for recording only and has another head for reproducing. this is because the timing of video signals reproduced b y the reproducing heads does not represent rotation phases of the recording heads as the recording heads and the reproducing heads are mounted at staggered positions in the rotation direction of the rotary drum (that is, the recording heads and the reproducing heads are mounted at different mounting angles to the rotary drum).

As described above, this created a problem with the conventional technology. It was difficult to get phase continuity of video signals before and after the editing start point on a magnetic tape through servo control of the rotation of the rotary drum. To cause the phase of vertical synchronous signals of the video signals reproduced by the recording heads before the editing start point to almost coincide with phases of vertical synchronous signals of input video signals to be recorded at time of the editing is not possible in a VTR of the above type because its recording heads are for recording only and reproduction is performed by another heads.

SUMMARY OF THE INVENTION

It is an object of the present invention to solve the above-mentioned problem involved in the conventional technology and to provide a video signal recording/reproducing apparatus that is capable of generating a phase continuity before and after the editing start point on a magnetic tape at the time of editing, even on a VTR that uses its recording heads for recording only and reproduction is made by another heads.

Briefly, in accordance with one aspect of this invention, there is provided a video signal recording/reproducing apparatus which comprises a rotary drum around which a video tape is wound, a rotary drum servo circuit for controlling a phase of rotation of the rotary drum to maintain the phase of rotation at a predetermined target phase, recording heads mounted on the rotary drum, reproducing heads mounted on the rotary drum at a position staggered in the rotation direction of the rotary drum from the recording heads, a recording signal processing unit for recording through the recording heads input video signals having a predetermined signal phase on the video tape wound around the rotary drum rotating at the predetermined rotational phase of the rotation, a reproducing signal processing unit for demodulating signals reproduced by the reproducing heads to generate reproduced video signals, a first synchronous signal extraction unit for extracting a synchronous signal that timing directly indicates the phase of recording signal onto tape, a second synchronous signal extraction unit for extracting a synchronous signal from the reproduced signal, a memory for storing a time difference which represents the elapsed time between when the recording heads pass a given location on the video tape and when the reproducing heads pass the given location, and a recording phase control unit for controlling the phase of the input video signals recorded on the video tape through the recording signal processing unit so that the phase of the synchronous signal extracted by the first synchronous signal extraction unit and the phase of the synchronous signal extracted by the second synchronous signal extraction unit are maintained in relation to the time difference stored in the memory.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS OF THE INVENTION

According to the present invention, phase continuity of video signals before and after the editing start point on a magnetic tape is obtained at the time of editing in the following manner. The relationship between the phases of input video signals and the rotation of the rotary drum is controlled on the basis of synchronous signals separated from video signals reproduced by the reproducing heads during the reproduction period before the editing start point and synchronous signals separated from input video signals to be recorded.

At this time, a time difference between when the recording heads and the reproducing heads contact the same position on the magnetic tape is measured and stored. That time difference is attributable to the difference in mounting angles of the recording heads and the reproducing heads, which are inherent in the VTR apparatus. This time difference is used to control operation of the recording phase control unit and phases of synchronous signals separated from input video signals synchronized with phases of synchronous signals separated from reproduced video signals using the time difference. As a result, the relationship between the phase of input video signals and the rotation of the rotary drum is optimized. Even on a video signal recording/reproducing apparatus that does not reproduce signals using the recording heads, phase continuity of video signals before and after the editing start point on a magnetic tape is obtainable similar to a VTR which reproduces signals from a magnetic tape by use of the recording heads.

In order to store the above-mentioned time difference data in a memory, when the VTR is in the recording state, video signals are reproduced by the reproducing heads immediately after the signals are recorded on a tape by the recording heads. A switching circuit provided at the input side of the reproduction signal processing unit selects signals reproduced by the reproducing heads and modulated input video signals and supplies the selected signals to the reproduction signal processing unit. With this switching operation, signals demodulated from modulated input video signals and video signals demodulated from reproduced signals appear alternately as output signals from the reproduction signal processing unit. Then, synchronous signals are separated from both these output signals of the reproduction signal processing unit and supplied to the a time difference measuring unit. Thus, a time difference between synchronous signals of input video signals and synchronous signals of reproduced video signals is measured and result is stored.

Various embodiments of the present invention will be explained hereinafter referring to the attached drawings.

Figure 1:
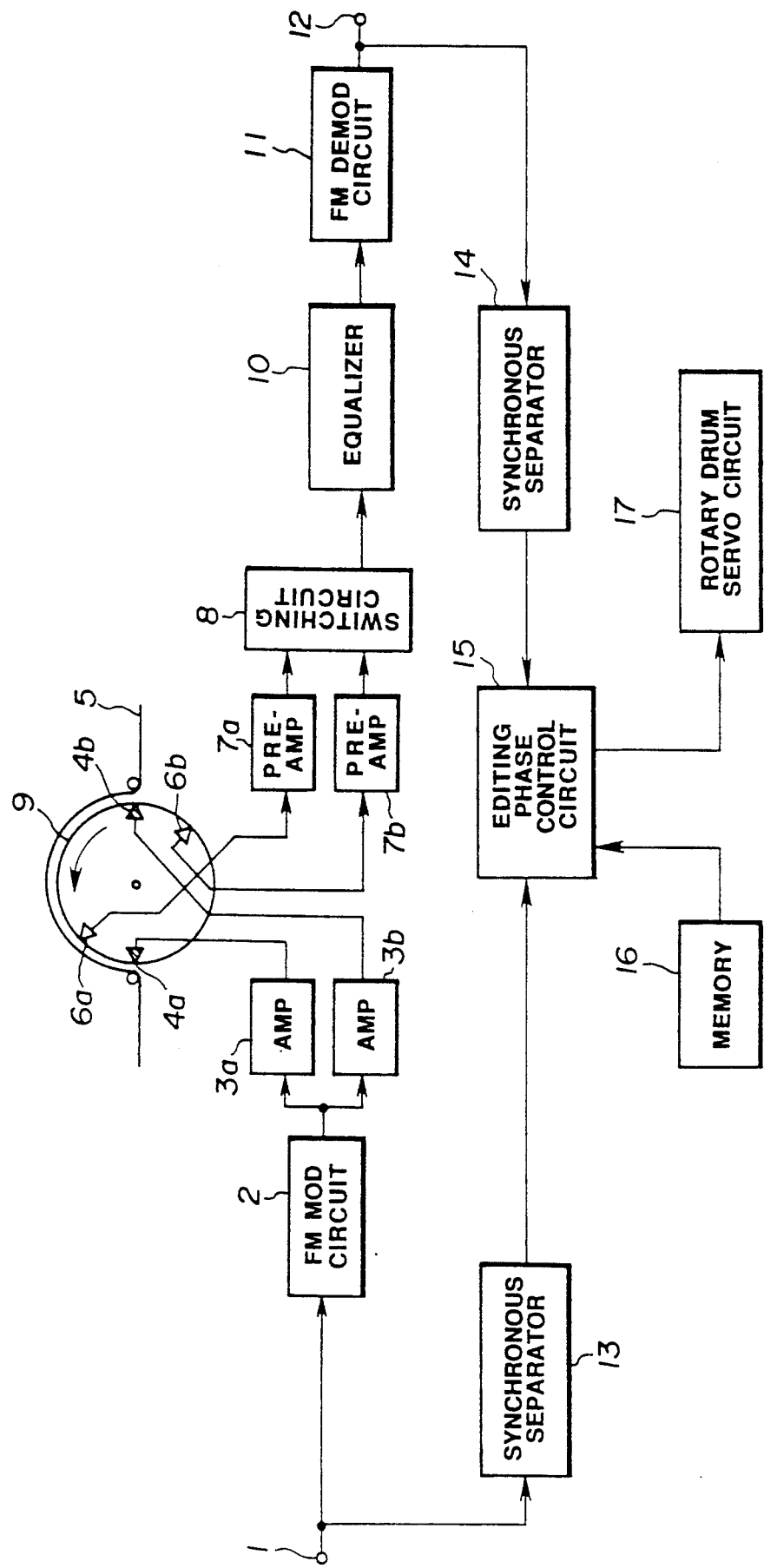
FIG. 1 is a block diagram showing a first embodiment of the present invention.

FIG. 1 is a block diagram showing the construction of the invention relative to editing of video signals, which is an essential part of a video signal recording/reproducing apparatus related to the first embodiment of this invention.

The apparatus of this invention is a helical scanning type VTR so designed that a magnetic tape, the recording medium, is wound round a rotary drum over a range of angle somewhat wider than 180°. FM modulated video signals are recorded on this magnetic tape by a pair of recording heads provided at positions opposing each other by 180° on the rotary drum, and signals recorded on a magnetic tape are reproduced by a pair of reproducing heads mounted at positions staggered in the rotating direction from the recording heads on the rotary drum.

In FIG. 1, input video signals that were input into the video input terminal 1 are FM modulated in an FM modulation circuit 2. Then, these FM video signals are recorded on a magnetic tape 5 by recording current supplied to recording heads 4a and 4b through a rotary transformer (not illustrated) from recording amplifiers 3a and 3b.

When the VTR is in the reproducing state, the signals reproduced from the magnetic tape 5 by reproducing heads 6a and 6b are led to pre-amplifiers 7a and 7b through the rotary transformer (not illustrated) and after amplification are input into a heads switching circuit 8. As output signals from the pre-amplifiers 7a and 7b are intermittent signals that are obtainable only in the period of about one half rotation on a rotary drum 9, the heads switching circuit 8 outputs a series of continuous signals by switching output signals from the pre-amplifiers 7a and 7b at very 180°.

The output signal from the heads switching circuit 8, after compensation of its frequency characteristic by an equalizer 10, is fed to an FM demodulation circuit 11, where it is demodulated into a video signal, and output from a video output terminal 12. A synchronous separator 13, a first synchronous signal extraction unit, extracts a synchronous signal from the input video signals that are input to the video input terminal 1 and sends then to an editing phase control circuit 15. A synchronous separator 14, a second synchronous signal extraction unit, extracts a synchronous signal from the reproduced video signal that is demodulated in the FM demodulation circuit 11 and sends it to the editing phase control circuit 15.

Figure 2:
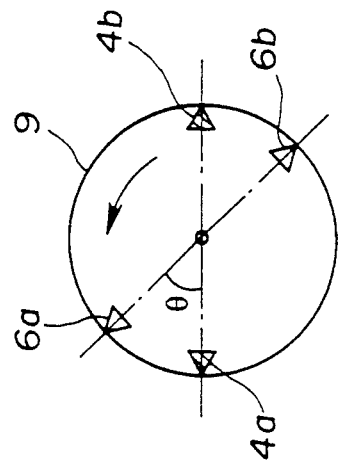
FIG. 2 is a diagram showing a mounting state of the recording heads and the reproducing heads on the rotary drum of FIG. 1.

A memory 16 stores in advance data on the difference (identified as $\Delta T$) between when the recording heads 4a (4b) and the reproducing heads 6a (6b) each contact the same position on the magnetic tape 5 at a steady rotational speed of the rotary drum 9. This time difference $\Delta T$ depends on the mounting angle difference $\theta$ between the recording heads 4a and the reproducing heads 6a or the recording heads 4b and the reproducing heads 6b to the rotary drum 9 as shown in FIG. 2. The time difference data $\Delta T$ stored in the memory 16 is given to the editing phase control circuit 13 at the time of the editing as data for correction. ROM (Read Only Memory), battery backed up RAM (Random Access Memory) or DIP switch can be used for the memory 16.

Figure 3:
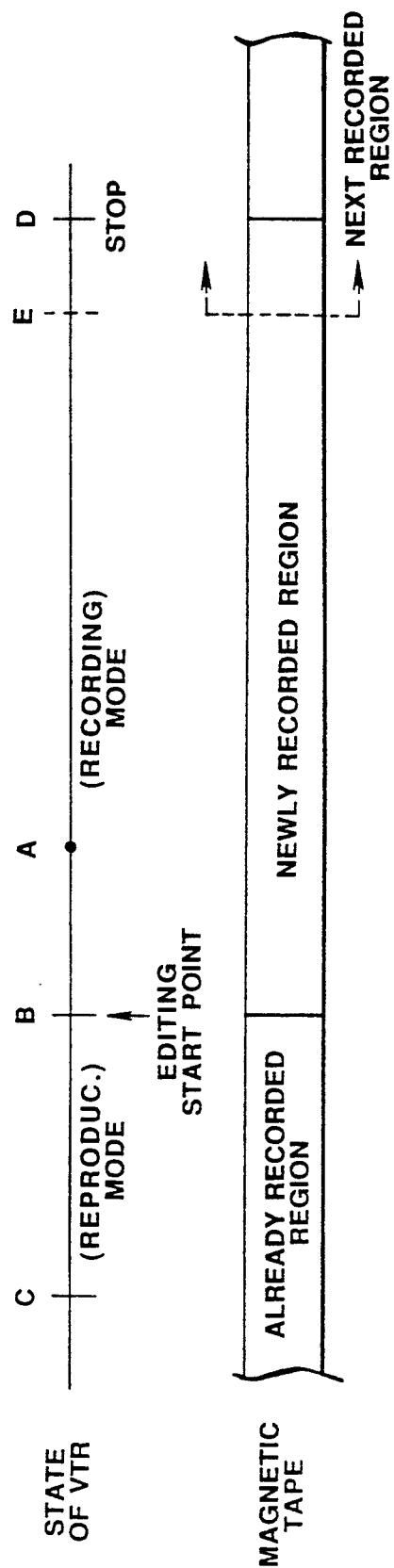
FIG. 3 is a diagram for explaining an editing operation in the first embodiment.

The output signal form the editing phase control circuit 15 is applied to a rotary drum servo circuit 17 and is used to control the rotation of the rotary drum 9 at the time of editing. Next, the operation of a VTR according to this embodiment during editing is explained referring to FIG. 3. FIG. 3 is a diagram for explaining the editing operation called "assemble editing" that is most often used, and shows the relation between the operation mode of the VTR and areas on a magnetic tape in the respective operation mode of the VTR. Assemble editing is an editing method to record video signals and audio signals connected to the input terminal of a VTR successively on the magnetic tape by superposing a portion to be newly recorded on a previously recorded portion.

Now, assuming that a VTR is stopped in the operation mode shown at a point A in FIG. 3 and the editing start point is desired to be a point B. If an editing execution command is given, the magnetic tape 5 is at once wound back automatically to a point C and the VTR is put in the reproducing mode. When the recording heads have reached the point B on the magnetic tape the VTR is switched from the reproducing mode to the recording mode and video signals or audio signals that are input into the input terminal of the VTR are recorded on the magnetic tape.

When the recording heads have reached a point D on the magnetic tape, the VTR stops the recording and running of the magnetic tape. Then, a point E is selected as the next editing start point and the assemble editing is carried out by repeating the above described similar operation. This operation is controlled based on a count value of a tape timer that is not illustrated.

The reproducing period from the point B to the point C is called the pre-roll period. In this pre-roll period, the editing phase control circuit 13 sends a phase control signal to the rotary drum servo circuit 17 for controlling the rotation of the rotary drum based on synchronous signals from the synchronous separators 13 and 14. This phase control signal corresponds to the corrected time difference caused by the mounting angle difference $\theta$ between the recording heads and the reproducing heads in the rotary drum 9 as shown in FIG. 2. This is generated according to the time difference T pre-stored in the memory 16. That is, assuming that the timing of synchronous signals from the synchronous separator 13 is to be $t_1$ and that of synchronous signals form the synchronous separator 14 is to be $t_2$, the phase control signal sent from the editing phase control circuit 15 is a signal corresponding to a phase difference $t_1 + \Delta T - t_2$, between $t_1 + T$ and $t_2$, and the rotating phase of the rotary drum 9 is so controlled that this phase difference becomes 0.

As a result, the rotation of the recording heads 4a and 4b is optimized for, input video signals that are input through the video signal input terminal and are to be recorded, that is, the phase of video signals to be newly recorded by the recording heads and that of the already recorded video signals before and after the editing start point B on the magnetic tape 5 shown in FIG. 3 are so controlled that they become continuous.

Figure 4:
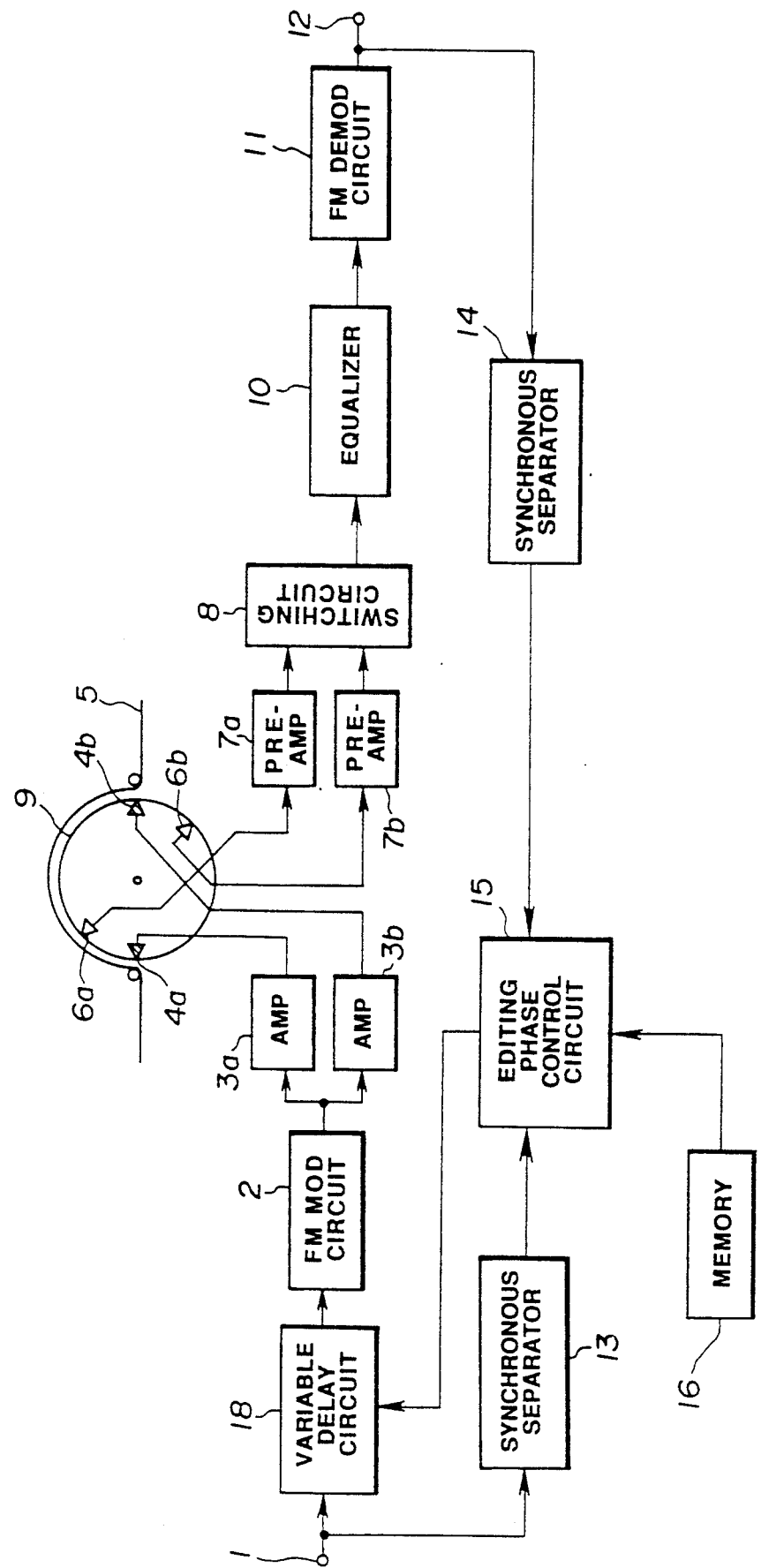
FIG. 4 is a block diagram showing a second embodiment of the present invention.

FIG. 4 is the block diagram showing the second embodiment of the present invention, with the same numbers assigned to the parts corresponding to those shown in FIG. 1. The second embodiment differs from the first embodiment in that the relationship between input video signals to be recorded and rotation of the rotary drum 9 is controlled by controlling a variable delay circuit provided to delay video signals input to the video signal input terminal 1, and not by changing the rotation of the rotary drum 9. That is, the phase control signal that is output from the editing phase control circuit 15 is given to a variable delay circuit 18 as a delay time control signal.

The variable delay circuit 18 is made up, for instance, using a semiconductor memory. Video signals being input are written into the memory after being digitized by, for instance, and A/D converter, and are read and output after being converted to analog signals by a D/A converter. What is necessary in this case is that the editing phase control circuit 15 controls the write timing to a semiconductor memory according to the timing $t_1$ of the synchronous signals separated from the input video signals by the synchronous separator 13 and controls the read timing from the semiconductor memory according to a timing that is shifted from the timing $t_1$ of the synchronous signals separated from the video signals reproduced from a position immediately before the editing start point by the synchronous separator 14 by the time difference $\Delta T$ stored in the memory 16. That is, it is sufficient to write video signals at the timing $t_1$ and read at the timing $t_2 - \Delta T$.

As the delay time control in the variable delay circuit 18 is executed very quickly and its control accuracy is higher than the rotating phase control of the rotary drum 9, the embodiment shown in FIG. 4 is excellent in response speed and phase control accuracy.

Figure 5:
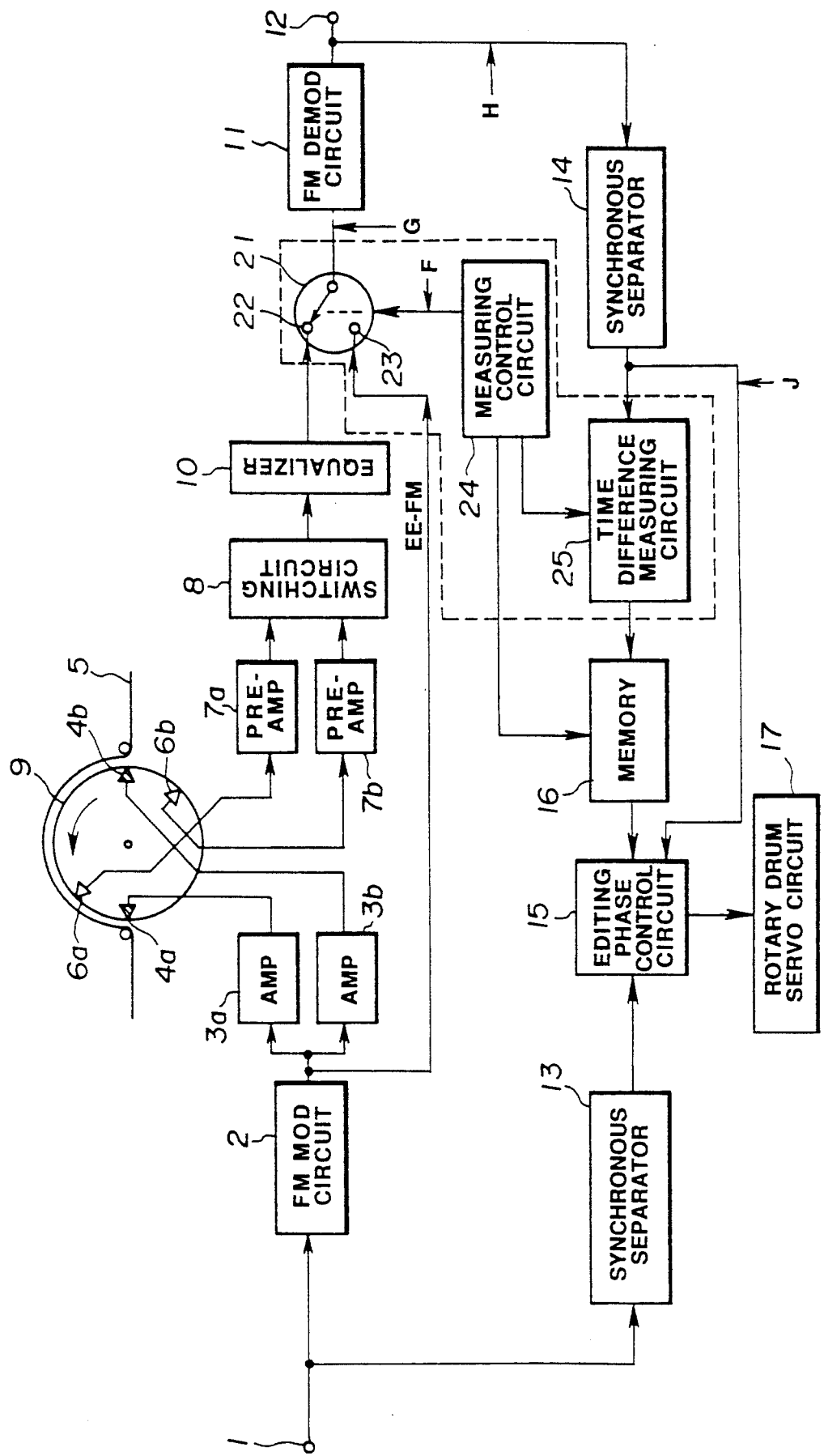
FIG. 5 is a block diagram showing a third embodiment of the present invention.

FIG. 5 is the block diagram showing a third embodiment of the present invention, which includes a means for measuring a time difference to be stored in the memory 16. In this embodiment, the reproduced signal that is output form the heads switching circuit 8 is connected to a "TAPE" side terminal 22 of az switching circuit 21 after compensation of the frequency characteristic is made by the equalizer 10. An "EE" side terminal 23 of the switching circuit 21 is connected with the output terminal of the FM modulation circuit 2.

The operation of the switching circuit 21 is controlled by a measuring control circuit 24. In the so called simultaneous reproduction mode, i.e., to monitor the recording state at the time of recording, the "TAPE" side terminal 22 is selected. During normal recording, the "EE" side terminal 23 is selected.

If a VTR operator selects "Time Difference Measuring Mode", the measuring control circuit 24 gives a pulse signal, synchronized with the rotary drum 9, to the switching circuit 21. As a result, the switching circuit 21 selects input video signals to be recorded and reproduced signals alternately and outputs them to the FM demodulation circuit 11. The reproduced video signals demodulated i the FM demodulation circuit 11 are sent to the video output terminal 12 and at the same time, input into the synchronous separator 14. The synchronous signal separated by the synchronous separator 14 is also supplied to the time difference measuring circuit 25.

The time difference measuring circuit 25 is made up using a digital counter and measures the time difference between the synchronous signals in the input video signals supplied from the synchronous separator and the synchronous signals in the reproducing video signals based on the control signal and clock signal from the measuring control circuit 24.

Figure 6:
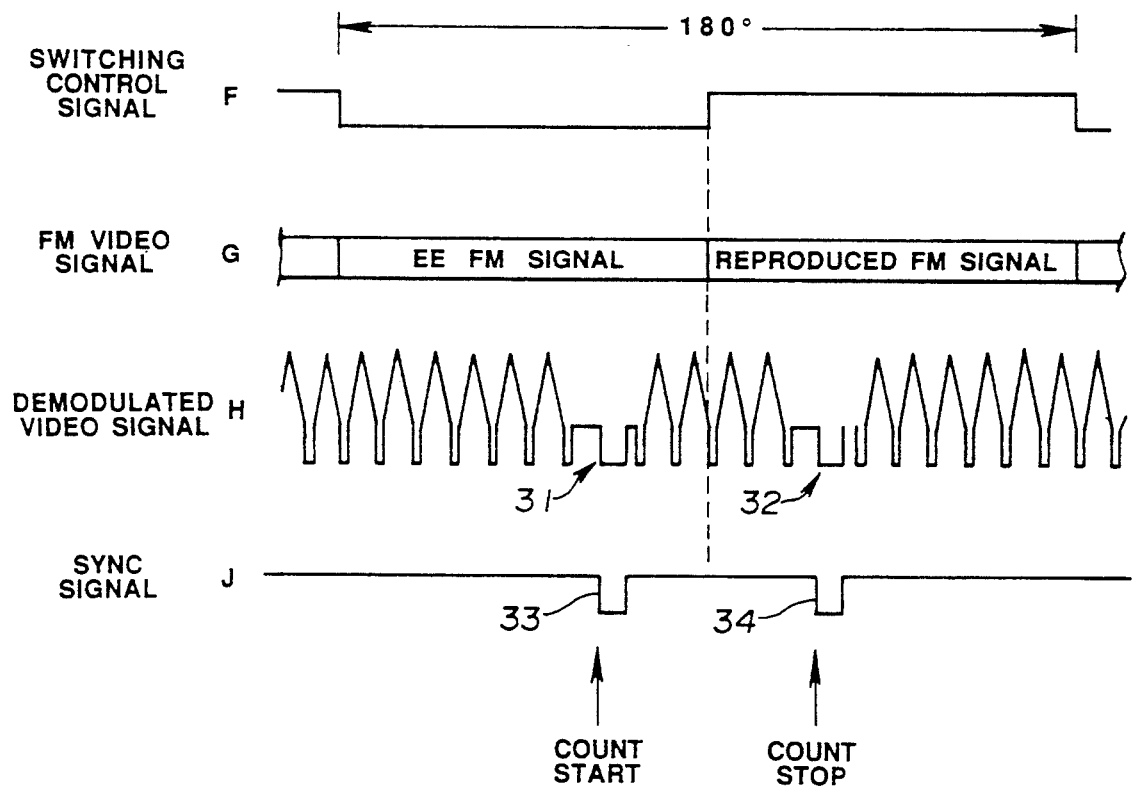
FIG. 6 is a timing chart for explaining an operation in the time difference measuring mode of the third embodiment.

FIG. 6 is a timing chart showing the waveforms of the parts having symbols F–J in FIG. 5 in "Time Difference Measuring Mode". F denotes the switching control signal that controls the switching operation of the switching circuit 21, G denotes the FM video signal that is output from the switching circuit 21, H denotes the video signal demodulated in the FM demodulation circuit 11, and J denotes the synchronous signals separated by the synchronous separator 13.

The switching control signal F is a square wave signal of which one period is the time required for the rotary drum 9 to turn 180° and is inversed close to the middle the time between when the recording heads recorded the vertical synchronous signals of input video signal and the reproducing heads reproduced the same vertical synchronous signals. In this embodiment, since the mounting angle difference θ between the recording heads 4a or 4b and the reproducing heads 6a or 6b is about 45°, the switching control signal F is inversed about 22.5° after the recording heads recorded the vertical synchronous signals.

The FM video signal G becomes the recorded FM signal (EE-FM) when the switching control signal F is at low level, while it becomes the reproduced FM signal at high level. The video signal H is the demodulated FM video signal G, 31 denotes the vertical synchronous signals in the input video signals, and 32 denotes the synchronous signals on the reproduced video signals. The synchronous signal J shows the vertical synchronous signal separated from the video signal H. 33 denotes the vertical synchronous signal in the input video signals, and 34 denotes the vertical synchronous signals in reproduced video signals.

The time difference measuring circuit 25 measures the time from the fall of the vertical synchronous signals 33 to the fall of the vertical synchronous signals 34 by counting clock signals from the measuring control circuit 24. The time measured in the time difference measuring circuit 25 is sent to the memory 16 and stored there at the fall of the switching control signal F.

Figure 7:
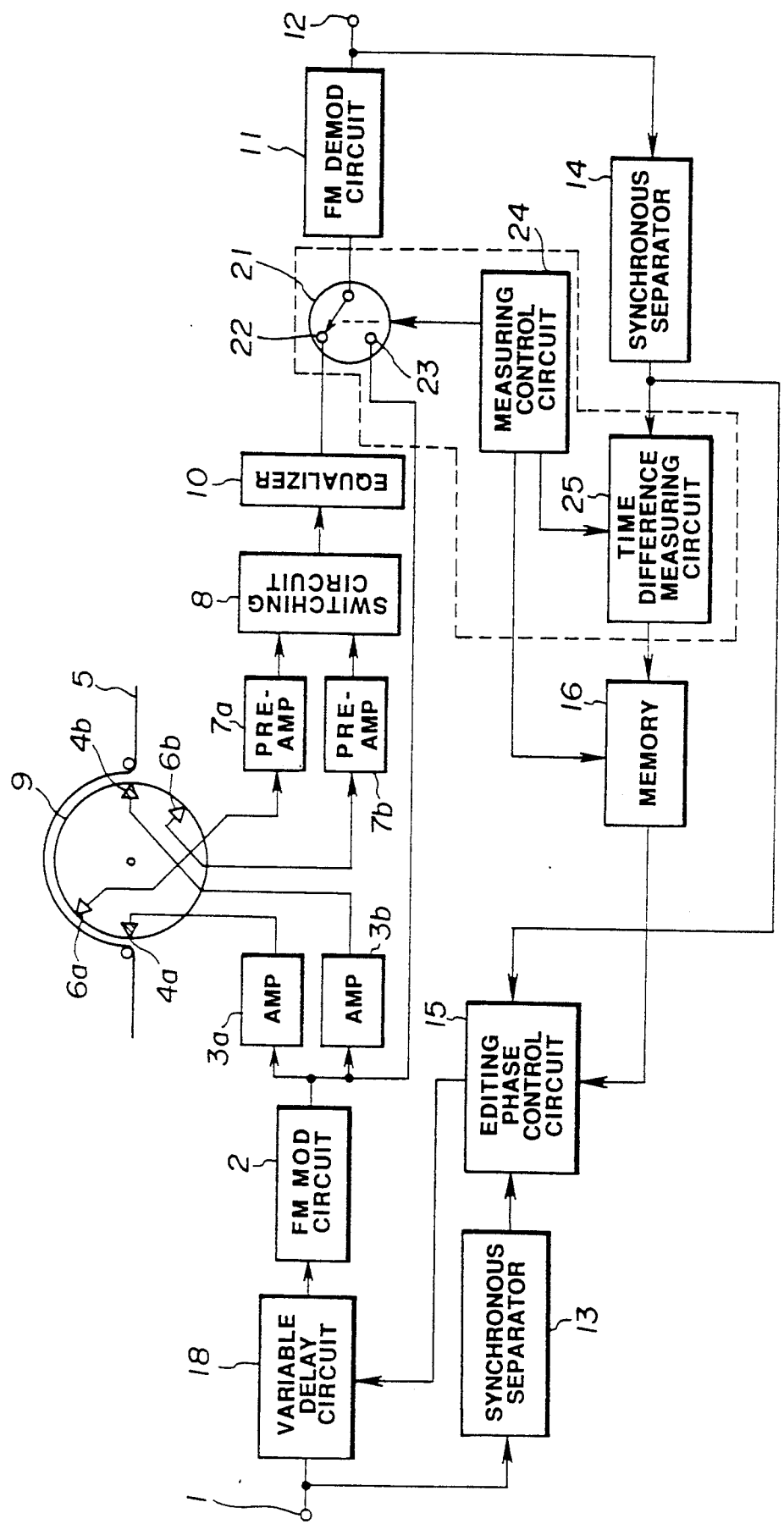
FIG. 7 is a block diagram showing a fourth embodiment of the present invention.

FIG. 7 is a block diagram showing a fourth embodiment of the present invention and is identical to the embodiment shown in FIG. 5 except for that the relation between the phase of the input video signal to be recorded and the rotating phase of the rotary drum 9 is controlled by controlling the delay time of the variable delay circuit 18 as in the embodiment shown in FIG. 4.

It is also possible to make the switching circuit 21, the measuring control circuit 24 and the time difference measuring circuit 25, all enclosed with the broken lines in FIGS. 5 and 7, an independent unit that is removable from the VTR. An operation may then set this module in a VTR and after writing time difference data in the memory 16, remove it. If each VTR is equipped with the switching circuit 21, it is better make the measuring control circuit 24 and the time difference measuring circuit 25 only modules.

If these parts are made as modules, as mentioned above, it becomes unnecessary to incorporate them into each VTR and therefore, it becomes possible to make VTRs small in size and cheap in price. In addition, it becomes possible to correct for variances in mounting angle differences between the recording heads and the reproducing heads of each VTR and to write more accurate time difference data in the memory 16. Further, if the variance in mounting angle difference between the recording heads and the reproducing heads of each VTR is negligible, time difference data common to each VTR may be written into the memory 16.

Further, it is possible to use the time difference data stored in the memory 16 for applications other than phase control at the time of editing. For instance, it may be used for phase adjustment of the tachometer pulse of the rotary drum, control track position adjustment, etc. when adjusting VTR.

Furthermore, in the above-mentioned embodiments, either of the rotation of the rotary drum 9 or the delay time of the variable delay circuit 18 is controlled, but it is to control both of them.

Next, explanation will be made as to the rotary phase control of the rotary drum 9 and the phase control of the input video signal in conjunction with their examples.

Figure 8:
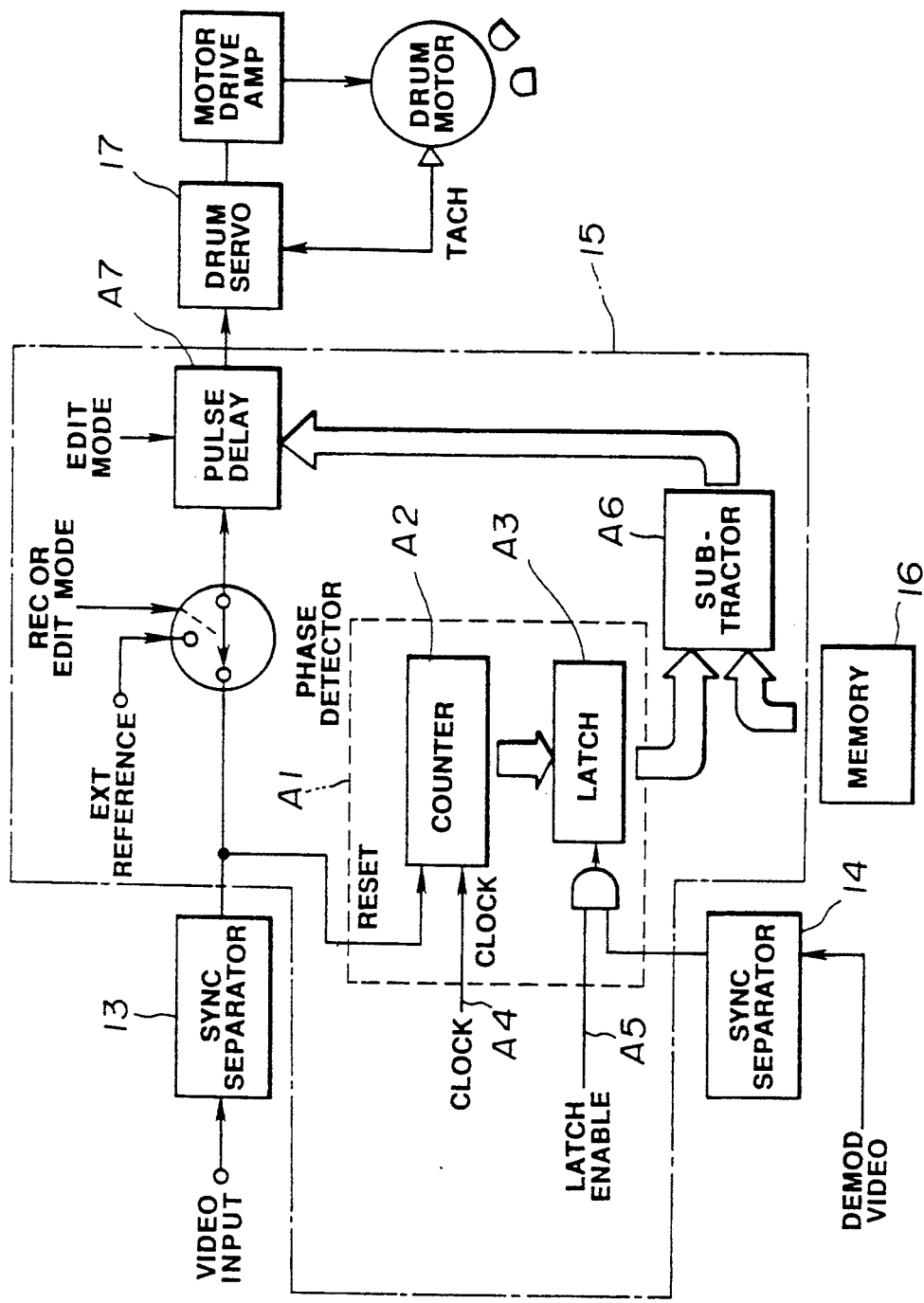
FIG. 8 is a diagram for explaining a phase control of the rotary drum.

First, the phase control of the drum 9 is realized, for example, by such a circuit as shown in FIG. 8. More specifically, as shown in FIG. 8, a phase detector A1 receives first and second synchronous signals from first and second synchronous separators and detects a phase difference therebetween.

The phase detector A1 comprises a counter A2 and a latch A3. The counter A2 is reset by the first synchronous signal and then counts a clock A4. An output of the counter A2 is connected to a data input terminal of the latch A3 so that the latch A3 receives a count value of the counter A2 therefrom in response to the second synchronous signal.

Through the aforementioned operations, the phase difference between the first and second synchronous signals is detected. The data updating of the latch A3 is restricted by a latch enable signal A5. The latch enable signal is at a high (enable) level during a reproduction period in the editing operation and a low (disable) level during a recording period.

A signal stored in the memory 16 corresponds to a count value based on the synchronization of the clock A4. A subtracter A6 subtracts the data in the memory 16 from the data in the latch A3. An output of the subtracter A6 is applied to a pulse delay circuit A7 to delay the first synchronous signal and then to supply the delayed first synchronous signal to the rotary drum servo circuit 17 as a phase reference. The pulse delay circuit A7 is usually fixed and in an EDIT mode, a delay in the pulse delay circuit A7 is controlled.

The reference signal of the rotary drum servo circuit 17, which corresponds to a synchronous signal separated from an input video signal in REC and EDIT modes and corresponds to an external reference signal supplied externally of the video tape recorder (VTR) in the reproduction mode.

In this way, by controlling the phase of the rotary drum, the phase of the recording head can be controlled to be a suitable phase based on the phase of a reproduced signal of the reproducing head. Of course, this is merely one example and another suitable method may be employed.

Figure 9:
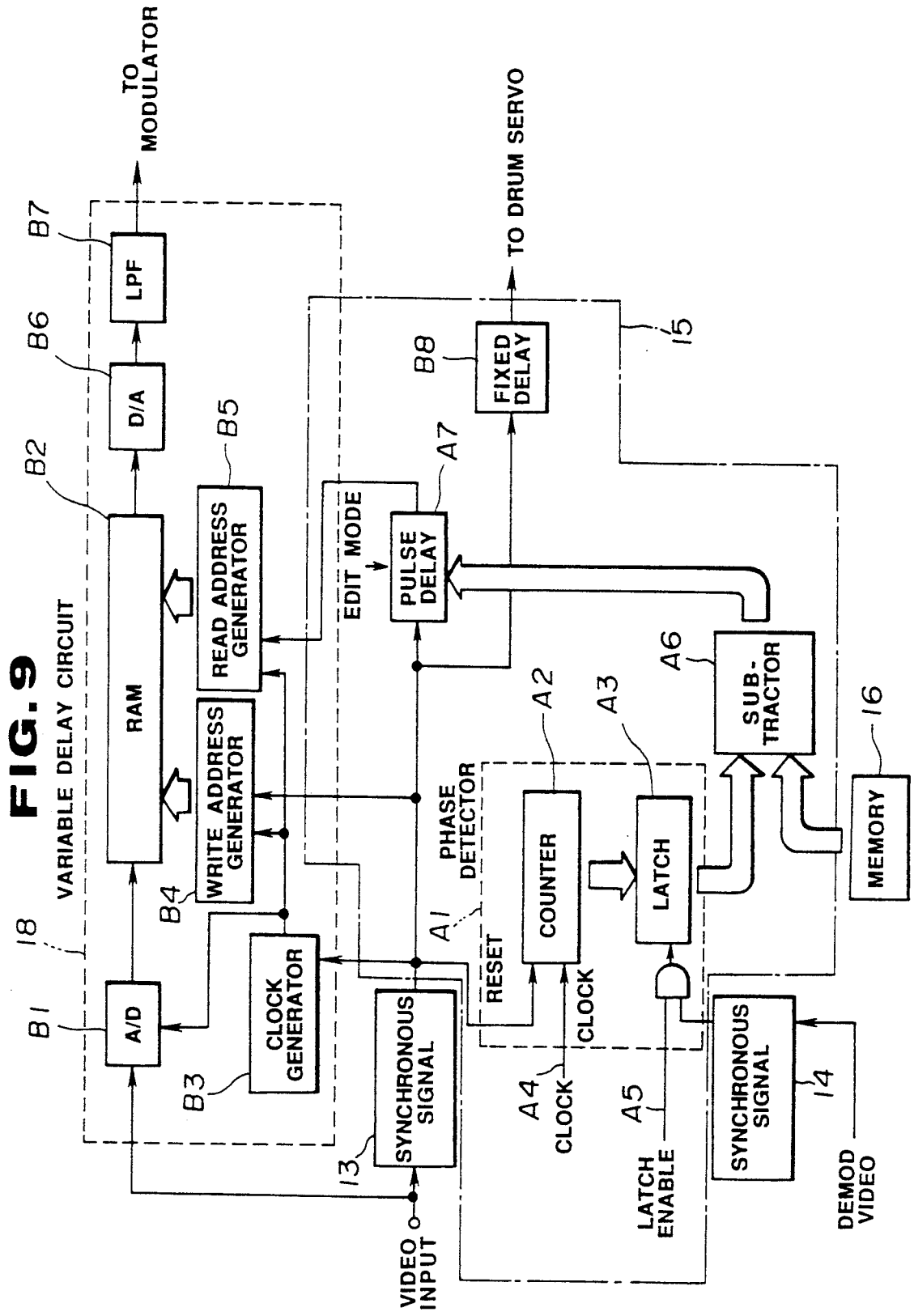
FIG. 9 is a diagram for explaining a phase control by delaying the video input signal.

An exemplary circuit for providing a delay to the input video signal to control the phase of a recording video signal is shown in FIG. 9. In this connection, a known exemplary circuit for changing the phase of an input video signal in the EDIT mode is disclosed in U.S. Pat. No. 5,029,021.

In FIG. 9, the arrangement of the phase detector A1, memory 16, subtracter A6, pulse delay circuit A7, etc. is the same as that of FIG. 8 and thus explanation thereof is omitted.

An input video signal is converted at an A-D converter B1 into a digital signal. The digital signal is written into a random access memory (RAM) B2. In more detail, the writing operation is controlled by a write address generator B4 on the basis of the first synchronous signal of the first synchronous separator and a clock signal of a clock generator B3 synchronized with the first synchronous signal. On the other hand, the reading of video data from the RAM B2 is controlled by a read address generator B5 based on a delayed synchronous signal received from the pulse delay circuit A7 and the clock signal. Eventually, the RAM B2 generates such video data being phase-controlled by a phase control circuit. The above video data is returned to an analog signal through a D-A converter B6 and an LPF B7 and then sent to a modulator. A part surrounded by a dotted line indicates the variable delay circuit 18. Used as a reference of the drum servo circuit is a delayed first synchronous signal delayed by a fixed delay circuit B8 so that the rotary drum is controllably rotated to keep a constant phase. This is merely one example and thus another suitable method may be employed as necessary.

In this way, the phase control circuit controls the phase of the drum or the phase of a video signal to be recorded whereby the phase of the video signal already recorded on the track can be made continuous to the phase of the video signal to be newly recorded on the track after an editing start point.

Figure 10:
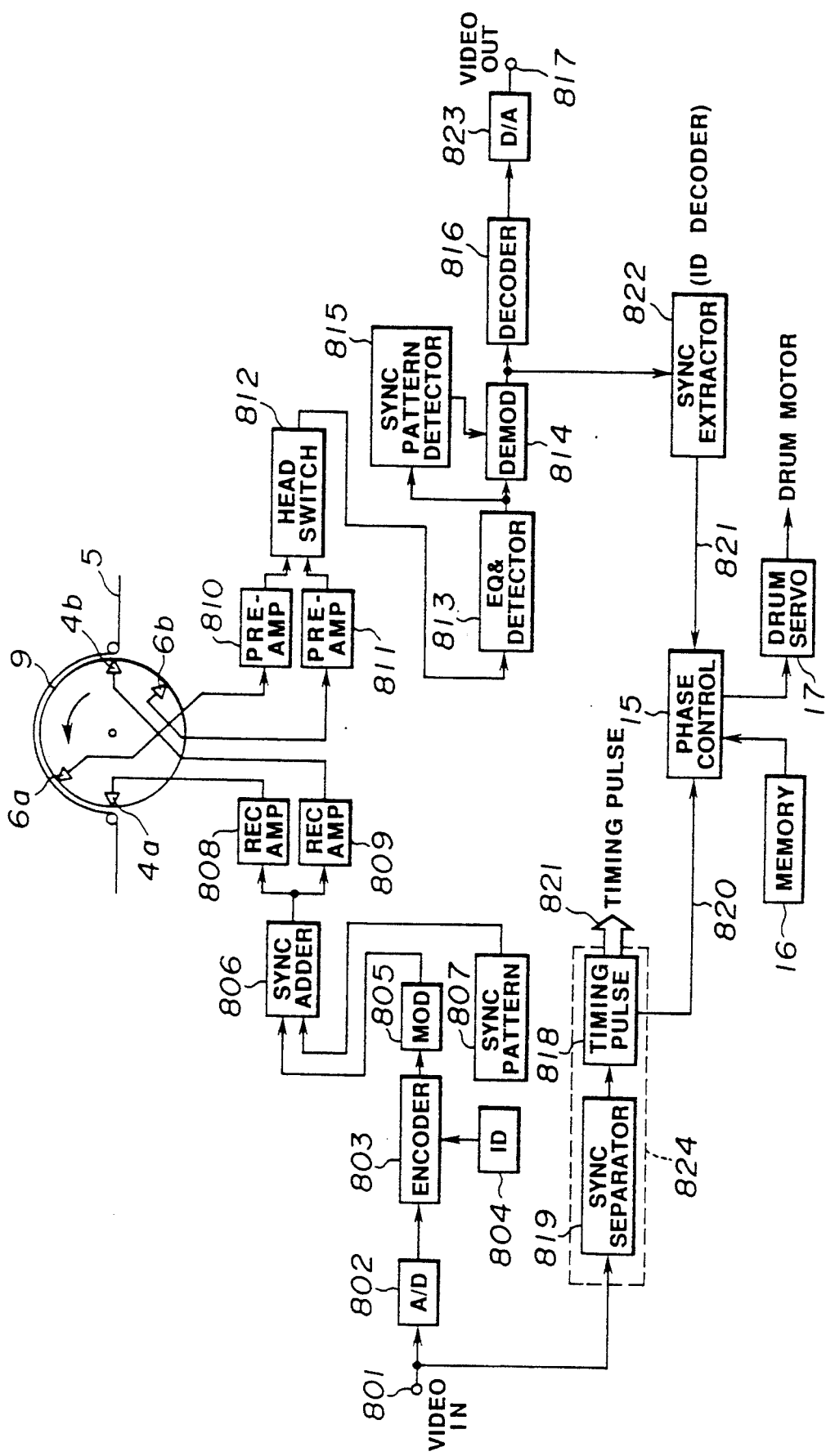
FIG. 10 is a block diagram showing a fifth embodiment of the present invention.

Explanation will next be made as to another embodiment in which the present invention is applied to a digital recording VTR. FIG. 10 is a block diagram of a major part of the digital VTR according to a fifth embodiment of the present invention. A video signal applied to a video input terminal 801 is converted at an A-D converter 802 into a digital signal. Digital recording, unlike analog recording, can correct an error caused by noise or drop-out at the recording and/or reproducing time. An encoder 803 performs its coding operation for error correction over audio data (not shown) and digital video data, and attaches to the encoded signal such ancillary data as identification data (ID) or user data generated at an ID generator 804 to generate recording data.

A modulator 805 is a circuit for performing its conversion operation for matching between the characteristic (e.g., power spectrum) of a signal to be recorded on the tape and the electromagnetic conversion system. The modulator 805 performs, for example, known 8-14 modulation to convert an 8-bit signal into a 14-bit signal. The signal subjected to the error correction coding operation is issued from the encoder 803 in the tape-recorded order on a synchronous block basis. However, for the purpose of distinguishing one synchronous block from another and demodulating a modulated signal, a synchronous signal is required. A synchronous adder 806 adds a block synchronous pattern generated at a synchronous pattern generator 807 to the data received from the modulator 805, adjusts the added data in its recording timing by a buffer memory provided therein, and then supplies the recording data to recording amplifiers 808 and 809. Signals amplified at the recording amplifiers are recorded on the tape alternately at intervals of 180° by means of recording heads 4a and 4b on a rotary drum.

Figure 11:
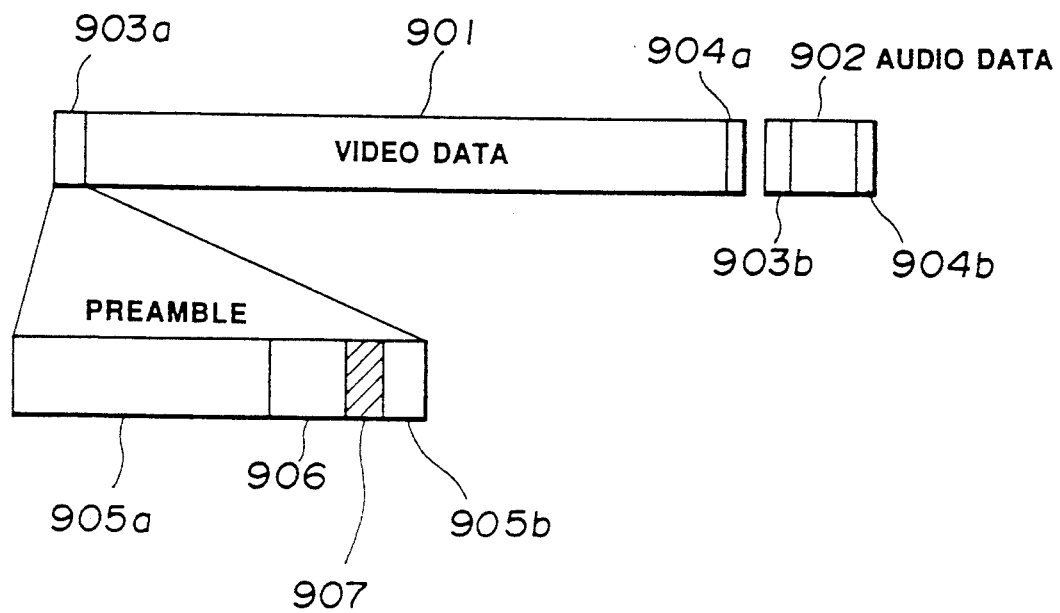
FIG. 11 is a diagram for explaining details of the recording data.

FIG. 11 shows details of such recording data. That is, video and audio sectors 901 and 902 have preambles 903a and 903b attached to their heads and postambles 904a and 904b attached to their tails, respectively. Recorded in the preamble 903 are fill patterns 905a and 905b for running up a phase locked loop (PLL) to generate a data discriminating clock, a plurality of continuous block synchronous patterns 906 and ID data 907. The ID data 907 include track number, field number and audio/video discriminating signal. The block synchronous pattern 906 and/or ID data 907 may be used as a phase reference for the recording signal. In the present embodiment, the timing of the ID signal is used as a synchronous signal.

Turning back to FIG. 10, the operation in its reproduction mode will be explained. Signals reproduced from the tape 5 by the reproducing heads 6a and 6b are amplified the preamplifiers 810 and 811 and switched at a head switching circuit 812 to alternately change over the signals reproduced at intervals of 180° rotation of the rotary drum and to thereby form a single signal.

An output signal of the head switching circuit 812 is subjected at an equalizer & detector 813 to an equalizing operation of such distortion as deterioration in the frequency characteristic of the electromagnetic conversion system and then to a binary discriminating operation to detect digital data. The aforementioned PLL is provided within this circuit. The equalizer & detector 813 supplies data discriminating timing and also provides the clock signal to a demodulator 814 and a synchronous pattern detector 815. The synchronous pattern detector 815 extracts the block synchronous pattern employed prior to the recording from a data stream of an output signal of the equalizer & detector 813 and sends start timing of the synchronous block to the demodulator 814. The demodulator 814 demodulates the modulated data based on the timing received from the synchronous pattern detector 815. Since the 8-14 modulation is carried out prior to the recording operation in this embodiment, the demodulator 814 performs the reverse operation, i.e., 14-8 conversion to restore its original data. A decoder 816 corrects a data error generated in the recording and/or reproducing process or conceals uncorrectable data to reconstruct video data and audio data (not shown). This operation is considered to the opposite operation to that of the encoder 803. An output signal of the decoder 816 is sent to a D-A converter 823 to be returned to an analog signal that is then sent to an output terminal 817 to be outputted therefrom. Although omitted in the drawing, the input and output signals are not always required to be in the form of analog signals but may be in the form of digital signals. In the latter case, the digital input signal is inputted directly to the encoder 803, while the digital output signal is outputted directly from the decoder 816.

Explanation will then be made as to the operation of a circuit associated with the editing operation which forms a subject matter of the present invention. The content of this operation is substantially the same as the content explained in conjunction with the analog VTR of FIG. 1, but different in that the timing reference of a recording signal is changed from the analog synchronous signal to a digital synchronous signal.

The timing reference of the recording signal is provided from a timing pulse generator 818 provided within a synchronous signal extractor 824. Timing signals generated from the synchronous signal extractor 824 are obtained based on a reference video synchronous signal separated from the input video signal through a synchronous separator 819 of the synchronous signal extractor 824. These timing signals include a synchronous signal 820 indicative of the timing of the recording signal to be supplied to a phase control circuit 15 as well as various sorts of timing signals 821 including the clock signal for use in various Darts of the signal processing circuit.

Figure 12:
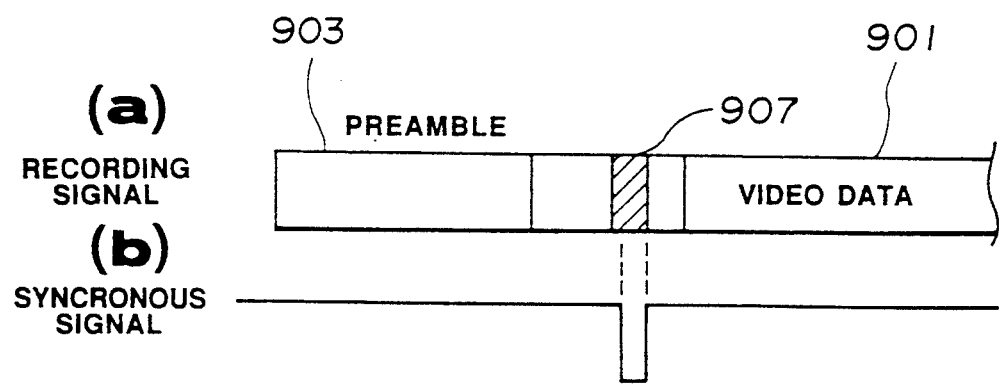
FIG. 12 is a diagram for explaining a timing of the synchronous signal.

Shown in FIG. 12 is the timing of the synchronous signal 820. More specifically, Part (a) of FIG. 12 shows the recording data in the output of the synchronous adder 806 and Part (b) of FIG. 12 shows the generation timing of the synchronous signal 820. The synchronous signal 820 is generated at the timing of the ID 907 in the preamble 903. The synchronous signal 821 indicative of timing of reproduction data is extracted from the output data of the demodulator 814 through a synchronous extractor 822. The synchronous signal 821 has the same timing relationship between the recording signal and synchronous signal shown in FIG. 10. The operations of the phase control circuit 15, memory 16 and drum servo circuit 17 are substantially the same as those in the analog VTR of FIG. 1 and thus explanation thereof is omitted.

Figure 13:
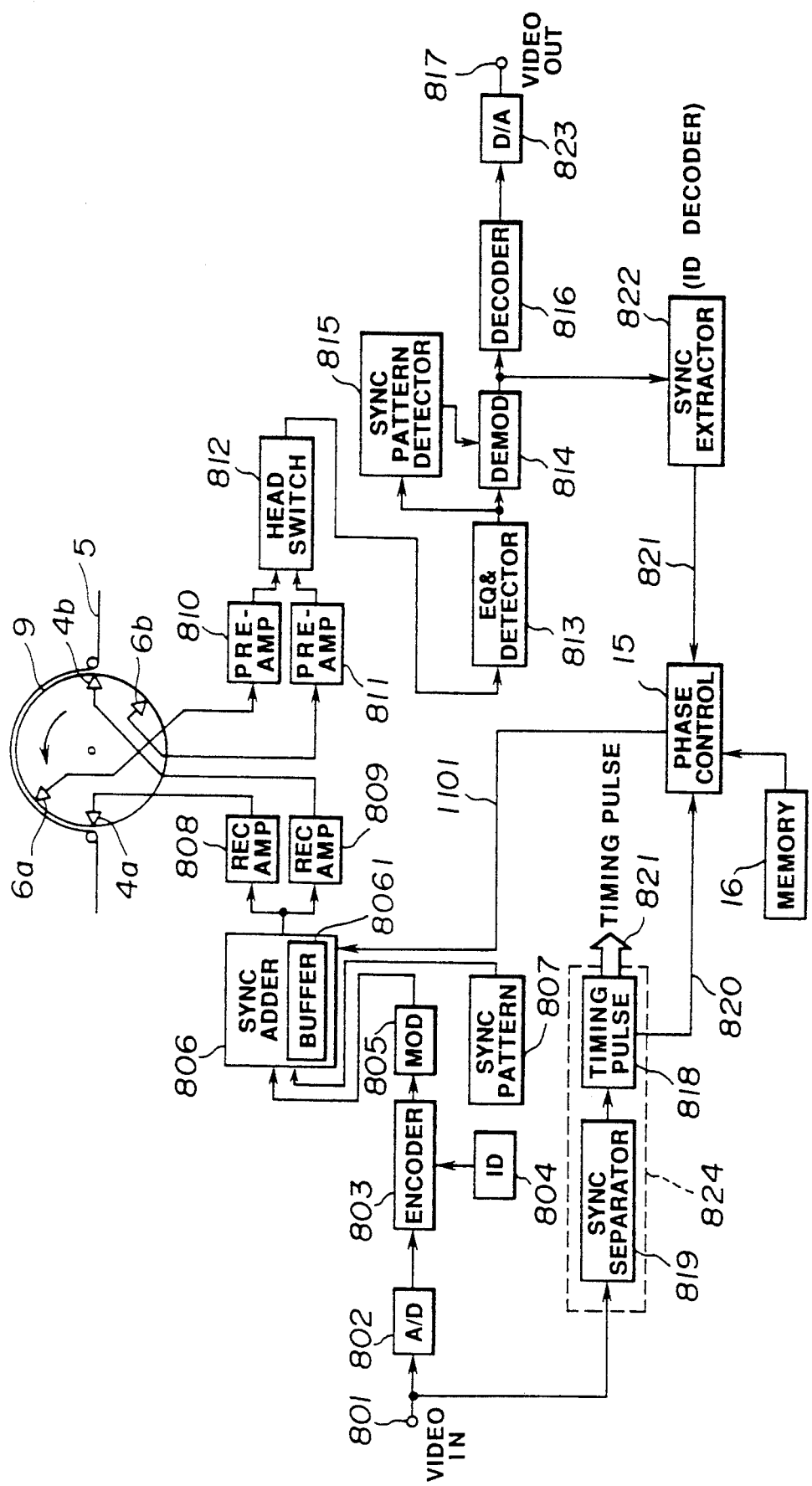
FIG. 13 is a block diagram showing a sixth embodiment of the present invention.

Referring to FIG. 13, there is shown a sixth embodiment of the present invention in the form of the digital VTR. The present embodiment corresponds to the embodiment of the analog VTR of FIG. 4 in which the phase control circuit 15 controls not the rotary phase of the drum but the phase of a recording signal.

A buffer memory 8061 for adjusting timing of the recording signal is provided within the synchronous adder 806 so that the reading timing of the memory 8061 is controlled by a phase control signal 1101 received from the phase control circuit 15 to change the phase of the recording signal. In this case, the rotary phase of the drum is kept to be constant.

Figure 14:
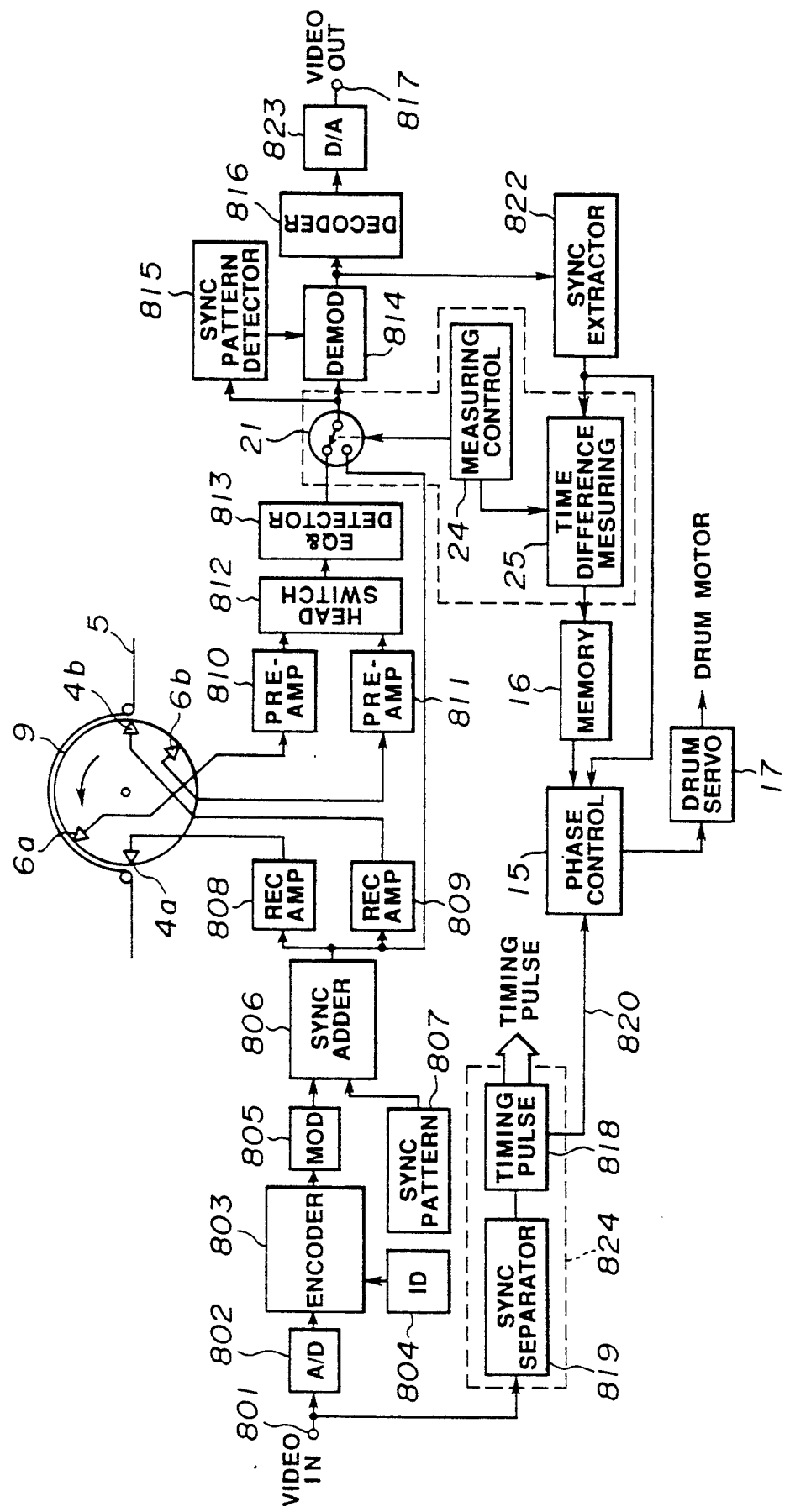
FIG. 14 is a block diagram showing a seventh embodiment of the present invention.

FIG. 14 shows a seventh embodiment in which a means for measuring a time difference between the recording and reproducing heads based on their different mounting positions is provided. The present embodiment is substantially the same as the analog VTR of FIG. 5, except for the different synchronous signals. The content of the digital recording/reproducing signal processing is substantially the same as in the embodiment of FIG. 10 and thus explanation thereof is omitted.

Figure 15:
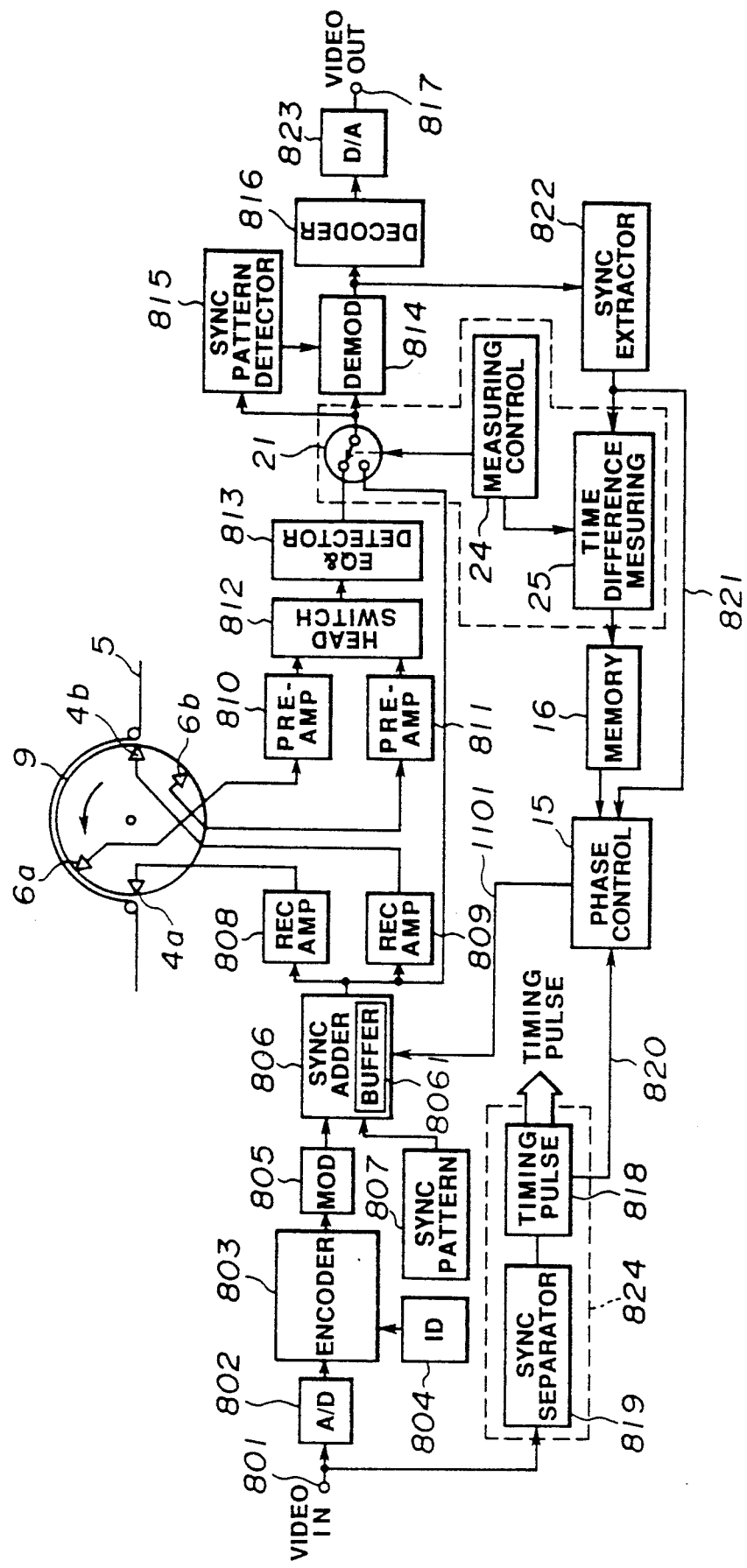
FIG. 15 is a block diagram showing an eighth embodiment of the present invention.

FIG. 15 is an eighth embodiment which contains the same phase difference measuring circuit as in the embodiment of FIG. 14 and in which the phase control circuit controls the phase of a recording signal.

As has been explained in the foregoing, even though the contents of the recording signals to be recorded on the tape are different, as in the analog VTR, it is also possible in the digital VTR to extract the timing signals from the recording signals for their phase comparison. Thus, when the time difference between the recording and reproducing heads based on the different mounting positions is previously stored in a memory and the phase comparison result is corrected on the basis of the content of the memory, the rotary phase of the recording head can be specified substantially exactly on the basis of the timing data obtained from the reproducing head. As a result, even such a VTR that cannot reproduce with use of a recording head, can establish highly accurate editing operation.

In the foregoing embodiments, the timing of the ID signal in a recording data stream is used to detect the synchronous signal. However, other timing data may be used for the same purpose. Further, it is possible to use timing data not in the video sector but in the audio sector. Although the buffer memory 8061 in the synchronous adder 806 has been used for the purpose of changing the phase of the recording signal in the embodiments of FIGS. 13 and 15, other suitable means may be employed so long as the means can adjust the phase of the recording signal at the time of recording the recording data onto the tape from the head. Another method of extracting the synchronous signal may be employed as a matter of course, so long as the timing of the recording signal and the timing of the signal reproduced by the reproducing head can be extracted.

The digitized video data and audio data have been encoded and recorded without being subjected to any data compression in the foregoing embodiments of the digital VTR. However, even in a digital VTR of the type wherein these data are subjected to such data compression of reducing image data with use of correlation between images as discrete cosine transform and then be recorded, since a predetermined preamble and a predetermined postamble are provided in a data pattern on the track, the use of the timing signals of these preamble and postamble enables realization of substantially the same effects. In other words, referring to FIG. 11, the format of the video data field 901 and audio data field 902 are changed, but the present invention may be applied similarly, so long as the preambles 903a and 903b and the postambles 904a and 904b have the same format (such a signal format that the timing data is recorded at a predetermined position in the data of one track).

Figure 16:
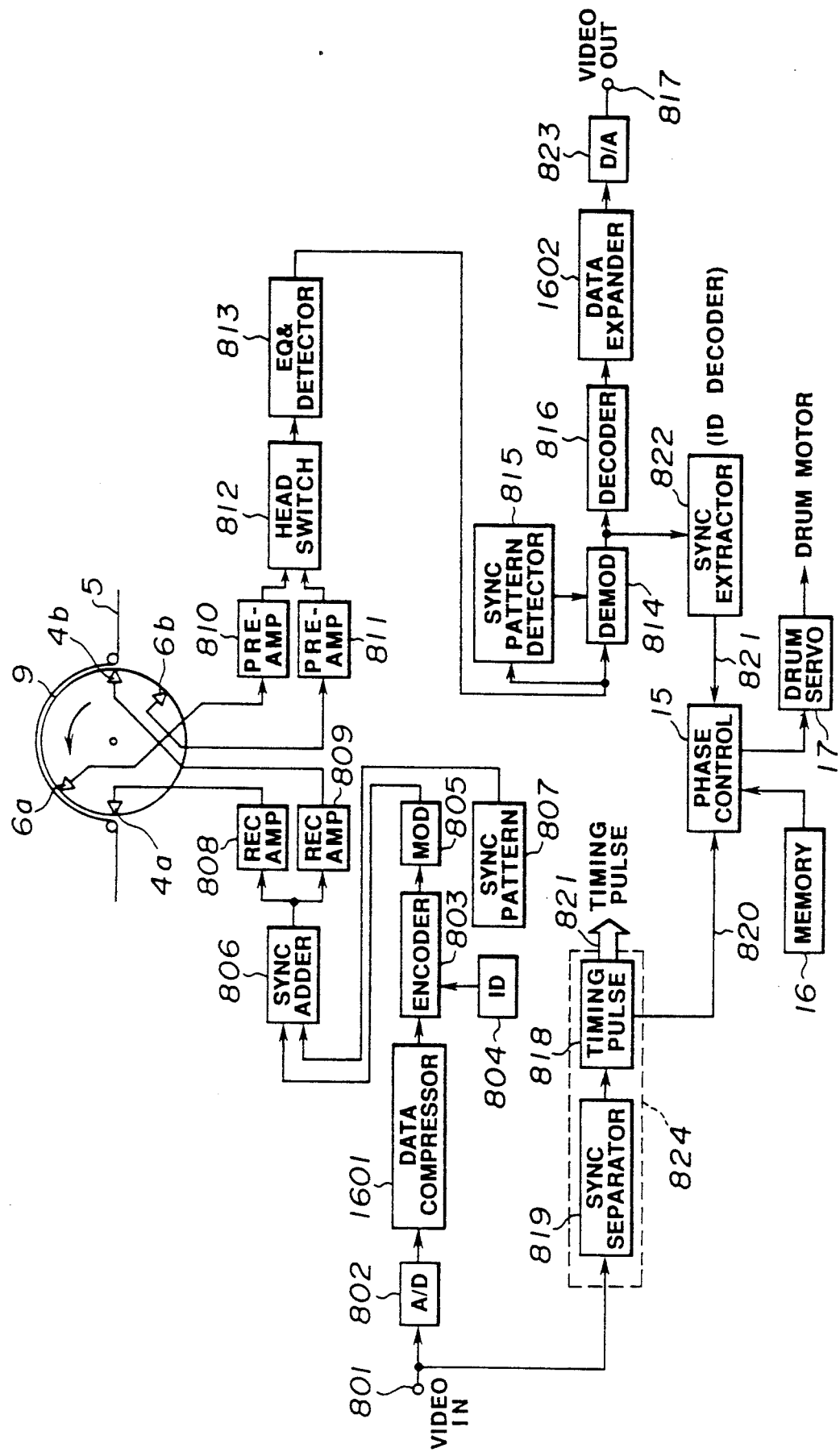
FIG. 16 is a block diagram showing a ninth embodiment of the present invention.

FIG. 16 shows a ninth embodiment of the present invention. The present embodiment corresponds to the embodiment of FIG. 10 but a data compressor 1601 is inserted between the A-D converter 802 and the encoder 803 in FIG. 10 and a data expander 1602 is inserted between the decoder 816 and the D-A converter 823 in FIG. 10, respectively. In the case where a previously-compressed video signal is inputted, the aforementioned A-D converter 802 and the data compressor 1601 can be removed.

Such an arrangement based on the data compression in the VTR may be similarly applied even to the embodiments of FIGS. 13 to 15.

As has been described, according to the present invention, it is possible to optimize the phase relation between signals to be recorded and the recording heads in a VTR which has separate recording and reproducing heads at the time of editing similar to VTRs that are capable of reproducing signals on a magnetic tape by the recording heads. This helps to reduce discontinuity of the phases of video signals before and after the editing start point on a magnetic tape.

The present invention may be implemented by modifying it in various ways within a range not deviating from its objects, nor from the scope of the claims appended hereto.

What is claimed is:

1. A video signal recording/reproducing apparatus using different heads for recording and reproducing video signals, comprising:
   a rotary drum on which a video tape is loaded;
   a rotary drum servo circuit for controlling a phase of rotation of the rotary drum to maintain the phase of rotation at a predetermined target phase;
   recording heads mounted on the rotary drum;
   reproducing heads mounted on the rotary drum at a position staggered in the rotating direction of the rotary drum from the recording heads;
   recording signal processing means for recording through the recording heads input video signals having a predetermined signal phase on the video tape loaded on the rotary drum rotating at the predetermined rotational phase of the rotation;
   reproducing signal processing means for demodulating signals reproduced by the reproducing heads to generate reproduced video signals;
   first synchronous signal extraction means for extracting a synchronous signal that timing directly indicates the phase of recording signal onto tape;
   second synchronous signal extraction means for extracting a synchronous signal from the reproduced signal;
   memory means for storing a time difference which represents the elapsed time between when the recording heads pass a given location on the video tape and when the reproducing heads pass the given location; and
   recording phase control means for controlling the phase of the input video signals recorded on the video tape through the recording signal processing means so that the phase of the synchronous signal extracted by the first synchronous signal extraction means and the phase of the synchronous signal extracted by the second synchronous signal extraction means are maintained in relation to the time difference stored in the memory means.

2. The video signal recording/reproducing apparatus of claim 1, wherein the recording phase control means includes variable delay means for delaying the phase of the input video signals provided to the recording signal processing means and controls the phase of the input video signals recorded on the video tape by controlling a degree of phase delay produced by the variable delay means.

3. A signal recording/reproducing apparatus using different heads for recording and reproducing video signals, comprising:
   a rotary drum on which a video tape is loaded;
   a rotary drum servo circuit for controlling a phase of rotation of the rotary drum to maintain the phase of rotation at a predetermined target phase;
   recording heads mounted on the rotary drum;
   reproducing heads mounted on the rotary drum at a position staggered in the rotating direction of the rotary drum from the recording heads;
   recording signal processing means for recording through the recording heads input video signals having a predetermined signal phase on the video tape loaded on the rotary drum rotating at the predetermined rotational phase of the rotation;
   reproducing signal processing means for demodulating signals reproduced by the reproducing heads to generate reproduced video signals;
   first synchronous signal extraction means for extracting a synchronous signal that timing directly indicates the phase of recording signal onto tape;
   second synchronous signal extraction means for extracting a synchronous signal from the reproduced signal;
   memory means for storing a time difference which represents the elapsed time between when the recording heads pass a given location on the video tape and when the reproducing heads pass the given location; and
   recording phase control means for controlling the phase of the input video signals recorded on the video tape through the recording signal processing means so that the phase of the synchronous signal extracted by the first synchronous signal extraction means and the phase of the synchronous signal extracted by the second synchronous signal extraction means are maintained in relation to the time difference stored in the memory means;
   wherein the recording phase control means controls the phase of the input video signals recorded on the video tape by controlling the predetermined target phase of the rotation provided to the rotary drum servo circuit.

4. The video signal recording/reproducing apparatus of claim 3, wherein the recording heads include pairs of heads separated 180° respectively.

5. The video signal recording/reproducing apparatus of claim 3, wherein the reproducing heads include pairs of heads separated 180° respectively.

6. The video signal recording/reproducing apparatus of claim 3, wherein the first and second synchronous signal extraction means extract vertical synchronous signals respectively.

7. The video signal recording/reproducing apparatus of claim 3, further comprising synchronous signal separator means for separating a synchronous signal from the input video signal and timing generating means for generating various sorts of timing signals for signal processing on the basis of the separated synchronous signal,
   wherein the recording signal processing means includes:
   an A-D converter for converting the input video signal into a digital signal;
   ancillary data generating means for generating such ancillary data as track number or field number on the video tape on the basis of the generated timing signals;
   an encoder for subjecting the digital input video signal to an error correction coding operation and attaching the generated ancillary data to the digital input video signal subjected to the error correction coding to form and output recording data;
   modulation means for performing its modulating operation over the recording data to be matched with a characteristic of an electromagnetic conversion system;
   synchronous pattern generating means for generating a block synchronous pattern for distinction between synchronous blocks as output units of the encoder for the recording data on the basis of the timing signals; and synchronous pattern attaching means for attaching the generated block synchronous pattern to the recording data modulated through the modulation means and supplying the recording data attached with the block synchronous pattern to the recording heads, and wherein the reproducing signal processing means includes:

detection means for detecting and reproducing a binary digital signal from the signal reproduced through the reproducing heads while equalizing a distortion component in the electromagnetic conversion system;

synchronous pattern extracting means for extracting the attached block synchronous pattern from the detected and reproduced digital signal;

demodulation means for subjecting the detected and reproduced digital signal to an operation reverse to the modulating processing of the modulation means while recognizing start timing of the synchronous blocks in the digital signal on the basis of the extracted block synchronous pattern to restore original recording data;

a decoder for subjecting the restored data to an error correction operation while performing reverse operation to the processing of the encoder to reconstruct input data; and a D-A converter for converting the reconstructed data into an analog signal.

8. The video signal recording/reproducing apparatus of claim 3, wherein the first synchronous signal extracting means extracts a timing identical to the timing of the ancillary data of the recording signal recorded on the tape through the recording heads, the second synchronous signal extracting means detects the ancillary data from the recording data restored by the demodulation means and extracts reproduction timing of the ancillary data, and the recording phase control means makes reference to the ancillary data extracted by the first and second synchronous signal extracting means as the synchronous signal.

9. The video signal recording/reproducing apparatus of claim 3, wherein the recording signal processing means further includes data compressing means for compressing the input video signal converted into the digital signal by the A-D converter and applying the compressed video signal to the encoder, and the reproducing signal processing means further includes data expanding means for expanding the data reconstructed by the decoder to the data prior to the compression and applying the expanded data to the D-A converter.

10. A video signal recording/reproducing apparatus using different heads for recording and reproducing video signals, comprising:

a rotary drum on which a video tape is loaded;

a rotary drum servo circuit for controlling a phase of rotation of the rotary drum to maintain the phase of rotation at a predetermined target phase;

recording heads mounted on the rotary drum;

reproducing heads mounted on the rotary drum at a position staggered in the rotating direction of the rotary drum from the recording heads;

recording signal processing means for recording through the recording heads input video signals having a predetermined signal phase on the video tape loaded on the rotary drum rotating at the predetermined rotational phase of the rotation;

reproducing signal processing means for demodulating signals reproduced by the reproducing heads to generate reproduced video signals;

switching means for selectively switching the recorded signals to be recorded and the reproduced signals to be supplied to the reproducing signal processing means;

first synchronous signal extraction means for extracting a synchronous signal that timing directly indicates the phase of recording signal onto tape;

second synchronous signal extraction means for extracting a synchronous signal from the reproduced signal;

time difference measuring means for measuring the time difference between a synchronous signal of the recorded signals and a synchronous signal of the reproduced video signals;

memory means for storing the time difference measured by the time difference measuring means; and recording phase control means for controlling the phase of the input video signals recorded on the video tape through the recording signal processing means so that the phase of the synchronous signal extracted by the first synchronous signal extraction means and the phase of the synchronous signal extracted by the second synchronous signal extraction means are maintained in relation to the time difference stored in the memory means.

11. The video signal recording/reproducing apparatus of claim 10, wherein the first and second synchronous signal extraction means separate vertical synchronous signals respectively.

12. A video signal recording/reproducing apparatus using different heads for recording and reproducing video signals, comprising:

a rotary drum;

a rotary drum servo circuit for controlling a phase of rotation of the rotary drum to maintain the phase of rotation at a predetermined target phase;

a recording head for recording input video signals having a predetermined signal phase on a media loaded on the rotary drum rotating at the predetermined phase of the rotation;

a reproducing head for reproducing recorded video signals mounted on the rotary drum at a position staggered in the rotating direction of the rotary drum from the recording head;

memory means for storing a time difference which represents the elapsed time between when the recording head passes a given location on the media and when the reproducing head passes the given location on the media;

first synchronous signal extraction means for extracting a synchronous signal that timing directly indicates the phase of recording signal onto the media;

second synchronous signal extraction means for extracting a synchronous signal from the reproduced signal;

a detector for detecting a phase difference between a phase of the synchronous signal extracted by the first synchronous signal extraction means and a phase of the synchronous signal extracted by the second synchronous signal extraction means; and recording phase control means for controlling the phase of the input video signals recorded on the media through the recording head to maintain the detected phase difference to be the time difference stored in the memory means so that a phase of the video signals to be newly recorded at locations succeeding an editing point on the media matches with a phase of the video signals previously recorded at locations preceding the editing point on the media, thereby producing a phase continuity in the video signals recorded on the media at the locations preceding and succeeding the editing point.

13. A video signal recording/reproducing apparatus using different heads for recording and reproducing video signals, comprising:

a rotary drum;

a rotary drum servo circuit for controlling a phase of rotation of the rotary drum to maintain the phase of rotation at a predetermined target phase;

a recording head for recording input video signals having a predetermined signal phase on a media loaded on the rotary drum rotating at the predetermined phase of the rotation;

a reproducing head for reproducing recorded video signals mounted on the rotary drum at a position staggered in the rotating direction of the rotary drum from the recording head;

memory means for storing a mounting angular difference being provided between the recording head and the reproducing head to the rotation center of the rotary drum;

first synchronous signal extraction means for extracting a synchronous signal that timing directly indicates the phase of recording signal onto the media;

second synchronous signal extraction means for extracting a synchronous signal from the reproduced signal;

a detector for detecting a phase difference between a phase of the synchronous signal extracted by the first synchronous signal extraction means and a phase of the synchronous signal extracted by the second synchronous signal extraction means; and recording phase control means for controlling the phase of the input video signals recorded on the media through the recording head to maintain the detected phase difference to be a time interval corresponding to the mounting angular difference stored in the memory means so that a phase of the video signals to be newly recorded at locations succeeding an editing point on the media matches with a phase of the video signals previously recorded at locations preceding the editing point on the media, thereby producing a phase continuity in the video signals recorded on the media at the locations preceding and succeeding the editing point.

14. A video signal recording/reproducing apparatus using different heads for recording and reproducing video signals, comprising:

a rotary drum;

a rotary drum servo circuit for controlling a phase of rotation of the rotary drum to maintain the phase of rotation at a predetermined target phase;

a recording head for recording input video signals having a predetermined signal phase on a media loaded on the rotary drum rotating at the predetermined phase of the rotation;

a reproducing head for reproducing recorded video signals mounted on the rotary drum at a position staggered in the rotating direction of the rotary drum from the recording head;

memory means for storing a mounting angular difference being provided between the recording head and the reproducing head to the rotation center of the rotary drum;

first synchronous signal extraction means for extracting a synchronous signal that timing directly indicates the phase of recording signal onto the media;

second synchronous signal extraction means for extracting a synchronous signal from the reproduced signal;

a detector for detecting a phase difference between a phase of the synchronous signal extracted by the first synchronous signal extraction means and a phase of the synchronous signal extracted by the second synchronous signal extraction means; and recording phase control means for controlling the phase of the input video signals recorded on the media through the recording head to maintain the detected phase difference to be a time interval corresponding to the mounting angular difference stored in the memory means.

15. The video signal recording/reproducing apparatus of claim 14, wherein the recording phase control means includes variable delay means for delaying a phase of the input video signals provided to the recording head and controls the phase of the input video signals recorded on the media by controlling a degree of phase delay produced by the variable delay means.

16. A method of controlling a recording phase of video signals in a video signal recording/reproducing apparatus using different heads for recording and reproducing video signals, which records input video signals having a predetermined signal phase on a video tape loaded on a rotary drum through the recording head mounted on the rotary drum, a phase of the rotation of the rotary drum being controlled to be a predetermined target phase by a rotary drum servo circuit, and reproduces the recorded video signals by the reproducing head mounted at a position staggered to a rotating direction of the rotary drum from the recording head, the method comprising:

a first step of previously storing a time difference representing an elapsed time between when the recording head passes a given location on the video tape and when the reproducing head passes the given location on the video tape;

a second step of separating synchronous signals from the input video signals;

a third step of separating synchronous signals from the reproduced video signals;

a fourth step of detecting a phase difference between a phase of the synchronous signals separated in the second step and a phase of the synchronous signals separated in the third step; and a fifth step of controlling a phase relation between the phase of the input video signals recorded through the recording head and the phase of the rotation of the rotary drum controlled through the rotary drum servo circuit so that the detected phase difference is maintained to be the time difference stored in the first step.

17. The method of claim 16, wherein the fifth step of controlling the phase relation between the phase of the input video signals and the phase of the rotation of the rotary drum is carried out by delaying the phase of the input video signals.

18. A method of controlling a recording phase of video signals in a video signal recording/reproducing apparatus using different heads for recording and reproducing video signals, which records input video signals having a predetermined signal phase on a video tape loaded on a rotary drum through the recording head mounted on the rotary drum, a phase of the rotation of the rotary drum being controlled to be a predetermined target phase by a rotary drum servo circuit, and reproduces the recorded video signals by the reproducing head mounted at a position staggered to a rotating direction of the rotary drum from the recording head, the method comprising:

a first step of previously storing a time difference representing an elapsed time between when the recording head passes a given location on the video tape and when the reproducing head passes the given location on the video tape;

a second step of separating synchronous signals from the input video signals;

a third step of separating synchronous signals from the reproduced video signals;

a fourth step of detecting a phase difference between a phase of the synchronous signals separated in the second step and a phase of the synchronous signals separated in the third step; and a fifth step of controlling a phase relation between the phase of the input video signals recorded through the recording head and the phase of the rotation of the rotary drum controlled through the rotary drum servo circuit so that the detected phase difference is maintained to be the time difference stored in the first step;

wherein the fifth step of controlling the phase relation between the phase of the input video signals and the phase of the rotation of the rotary drum is carried out by controlling the predetermined target phase of the rotation provided to the rotary drum servo circuit.

19. A video signal recording/reproducing apparatus using different heads for recording and reproducing video signals, comprising:

a rotary drum;

a rotary drum servo circuit for controlling a phase of rotation of the rotary drum to maintain the phase of rotation at a predetermined target phase;

a recording head for recording input video signals having a predetermined signal phase on a media loaded on the rotary drum rotating at the predetermined phase of the rotation;

a reproducing head for reproducing recorded video signals mounted on the rotary drum at a position staggered in the rotating direction of the rotary drum from the recording head;

memory means for storing a time difference which represents the elapsed time between when the recording head passes a given location on the media and when the reproducing head passes the given location on the media;

first synchronous signal extraction means for extracting a synchronous signal that timing directly indicates the phase of recording signal onto the media;

second synchronous signal extraction means for extracting a synchronous signal from the reproduced signal;

a detector for detecting a phase difference between a phase of the synchronous signal extracted by the first synchronous signal extraction means and a phase of the synchronous signal extracted by the second synchronous signal extraction means; and recording phase control means for controlling the phase of the input video signals recorded on the media through the recording head to maintain the detected phase difference to be the time difference stored in the memory means so that a phase of the video signals to be newly recorded at locations succeeding an editing point on the media matches with a phase of the video signals previously recorded at locations preceding the editing point on the media, thereby producing a phase continuity in the video signals recorded on the media at the locations preceding and succeeding the editing point;

wherein the recording phase control means controls the phase of the input video signals recorded on the video tape by controlling the predetermined target phase of the rotation provided to the rotary drum servo circuit.

20. The video signal recording/reproducing apparatus of claim 19, further comprising synchronous signal separator means for separating a synchronous signal from the input video signal and timing generating means for generating various sorts of timing signals for signal Processing on the basis of the separated synchronous signal, wherein the recording signal processing means includes:

an A-D converter for converting the input video signal into a digital signal;

ancillary data generating means for generating such ancillary data as track number or field number on the recording medium on the basis of the generated timing signals;

an encoder for subjecting the digital input video signal to an error correction coding operation and attaching the generated ancillary data to the digital input video signal subjected to the error correction coding to form and output recording data;

modulation means for performing its modulating operation over the recording data to be matched with a characteristic of an electromagnetic conversion system;

synchronous pattern generating means for generating a block synchronous pattern for distinction between synchronous blocks as output units of the encoder for the recording data on the basis of the timing signals, and synchronous pattern attaching means for attaching the generated block synchronous pattern to the recording data modulated through the modulation means and supplying the recording data attached with the block synchronous pattern to the recording heads;

and wherein the reproducing signal processing means includes:

detection means for detecting and reproducing a binary digital signal from the signal reproduced through the reproducing heads while equalizing a distortion component in the electromagnetic conversion system;

synchronous pattern extracting means for extracting the attached block synchronous pattern from the detected and reproduced digital signal;

demodulation means for subjecting the detected and reproduced digital signal to an operation reverse to the modulating processing of the modulation means while recognizing start timing of the synchronous blocks in the digital signal on the basis of the extracted block synchronous pattern to restore original recording data;

a decoder for subjecting the restored data to an error correction operation while performing reverse operation to the processing of the encoder to reconstruct input data; and a D-A converter for converting the reconstructed data into an analog signal.

21. The video signal recording/reproducing apparatus of claim 19, wherein the first synchronous signal extracting means extracts a timing identical to the timing of the ancillary data of the recording signal recorded on the recording medium through the recording heads, the second synchronous signal extracting means detects the ancillary data from the recording data restored by the demodulation means and extracts reproduction timing of the ancillary data, and the recording phase control means makes reference to the ancillary data extracted by the first and second synchronous signal extracting means as the synchronous signal.

22. The video signal recording/reproducing apparatus of claim 19, wherein the recording signal processing means further includes data compressing means for compressing the input video signal converted into the digital signal by the A-D converter and applying the compressed video signal to the encoder, and the reproducing signal processing means further includes data expanding means for expanding the data reconstructed by the decoder to the data prior to the compression and applying the expanded data to the D-A converter.

23. A video signal recording/reproducing apparatus using different heads for recording and reproducing video signals, comprising:

a rotary drum;

a rotary drum servo circuit for controlling a phase of rotation the rotary drum to maintain the phase of rotation at a predetermined target phase;

a recording head for recording input video signals having a predetermined signal phase on a media loaded on the rotary drum rotating at the predetermined phase of the rotation;

a reproducing head for reproducing recorded video signals mounted on the rotary drum at a position staggered in the rotating direction of the rotary drum from the recording head;

memory means for storing a mounting angular difference being provided between the recording head and the reproducing head to the rotation center of the rotary drum;

first synchronous signal extraction means for extracting a synchronous signal that timing directly indicates the phase of recording signal onto the media;

second synchronous signal extraction means for extracting a synchronous signal from the reproduced signal;

a detector for detecting a phase difference between a phase of the synchronous signal extracted by the first synchronous signal extraction means and a phase of the synchronous signal extracted by the second synchronous signal extraction means; and recording phase control means for controlling the phase of the input video signals recorded on the media through the recording head to maintain the detected phase difference to be a time interval corresponding to the mounting angular difference stored in the memory means so that a phase of the video signals to be newly recorded at locations succeeding an editing point on the media matches with a phase of the video signals previously recorded at locations preceding the editing point on the media, thereby producing a phase continuity in the video signals recorded on the media at the locations preceding and succeeding the editing point;

wherein the recording phase control means controls the phase of the input video signals recorded on the video tape by controlling the predetermined target phase of the rotation provided to the rotary drum servo circuit.

24. The video signal recording/reproducing apparatus of claim 23, further comprising synchronous signal separator means for separating a synchronous signal from the input video signal and timing generating means for generating various sorts of timing signals for signal processing on the basis of the separated synchronous signal, wherein the recording signal processing means includes:

an A-D converter for converting the input video signal into a digital signal;

ancillary data generating means for generating such ancillary data as track number or field number on the recording medium on the basis of the generated timing signals;

an encoder for subjecting the digital input video signal to an error correction coding operation and attaching the generated ancillary data to the digital input video signal subjected to the error correction coding to form and output recording data;

modulation means for performing its modulating operation over the recording data to be matched with a characteristic of an electromagnetic conversion system;

synchronous pattern generating means for generating a block synchronous pattern for distinction between synchronous blocks as output units of the encoder for the recording data on the basis of the timing signals; and synchronous pattern attaching means for attaching the generated block synchronous pattern to the recording data modulated through the modulation means and supplying the recording data attached with the block synchronous pattern to the recording heads, and wherein the reproducing signal processing means includes:

detection means for detecting and reproducing a binary digital signal from the signal reproduced through the reproducing heads while equalizing a distortion component in the electromagnetic conversion system;

synchronous pattern extracting means for extracting the attached block synchronous pattern from the detected and reproduced digital signal;

demodulation means for subjecting the detected and reproduced digital signal to an operation reverse to the modulating processing of the modulation means while recognizing start timing of the synchronous blocks in the digital signal on the basis of the extracted block synchronous pattern to restore original recording data;

a decoder for subjecting the restored data to an error correction operation while performing reverse operation to the processing of the encoder to reconstruct input data; and a D-A converter for converting the reconstructed data into an analog signal.

25. The video signal recording/reproducing apparatus of claim 23, wherein the first synchronous signal extracting means extracts a timing identical to the timing of the ancillary data of the recording signal recorded on the recording medium through the recording heads, the second synchronous signal extracting means detects the ancillary data from the recording data restored by the demodulation means and extracts reproduction timing of the ancillary data, and the recording phase control means makes reference to the ancillary data extracted by the first and second synchronous signal extracting means as the synchronous signal.

26. The video signal recording/reproducing apparatus of claim 23, wherein the recording signal processing means further includes data compressing means for compressing the input video signal converted into the digital signal by the A-D converter and applying the compressed video signal to the encoder, and the reproducing signal processing means further includes data expanding means for expanding the data reconstructed by the decoder to the data prior to the compression and applying the expanded data to the D-A converter.

27. A video signal recording/reproducing apparatus using different heads for recording and reproducing video signals, comprising:
   a rotary drum;
   a rotary drum servo circuit for controlling a phase of rotation of the rotary drum to maintain the phase of rotation at a predetermined target phase;
   a recording head for recording input video signals having a predetermined signal phase on a media loaded on the rotary drum rotating at the predetermined phase of the rotation;
   a reproducing head for reproducing recorded video signals mounted on the rotary drum at a position staggered in the rotating direction of the rotary drum from the recording head;
   memory means for storing a mounting angular difference being provided between the recording head and the reproducing head to the rotation center of the rotary drum;
   first synchronous signal extraction means for extracting a synchronous signal that timing directly indicates the phase of recording signal onto the media;
   second synchronous signal extraction means for extracting a synchronous signal from the reproduced signal;
   a detector for detecting a phase difference between a phase of the synchronous signal extracted by the first synchronous signal extraction means and a phase of the synchronous signal extracted by the second synchronous signal extraction means; and
   recording phase control means for controlling the phase of the input video signals recorded on the media through the recording head to maintain the detected phase difference to be a time interval corresponding to the mounting angular difference stored in the memory means;
   wherein the recording phase control means controls the phase of the input video signals recorded on the media by controlling the predetermined target phase of the rotation provided to the rotary drum servo circuit.

28. The video signal recording/reproducing apparatus of claim 27, further comprising synchronous signal separator means for separating a synchronous signal from the input video signal and timing generating means for generating various sorts of timing signals for signal processing on the basis of the separated synchronous signal,
   wherein the recording signal processing means includes:
   an A-D converter for converting the input video signal into a digital signal;
   ancillary data generating means for generating such ancillary data as track number or field number on the recording medium on the basis of the generated timing signals;
   an encoder for subjecting the digital input video signal to an error correction coding operation and attaching the generated ancillary data to the digital input video signal subjected to the error correction coding to form and output recording data, modulation means for performing its modulating operation over the recording data to be matched with a characteristic of an electromagnetic conversion system;
   synchronous pattern generating means for generating a block synchronous pattern for distinction between synchronous blocks as output units of the encoder for the recording data on the basis of the timing signals; and
   synchronous pattern attaching means for attaching the generated block synchronous pattern to the recording data modulated through the modulation means and supplying the recording data attached with the block synchronous pattern to the recording heads,
   and wherein the reproducing signal processing means includes:
   detection means for detecting and reproducing a binary digital signal from the signal reproduced through the reproducing heads while equalizing a distortion component in the electromagnetic conversion system;
   synchronous pattern extracting means for extracting the attached block synchronous pattern from the detected and reproduced digital signal;
   demodulation means for subjecting the detected and reproduced digital signal to an operation reverse to the modulating processing of the modulation means while recognizing start timing of the synchronous blocks in the digital signal on the basis of the extracted block synchronous pattern to restore original recording data;
   a decoder for subjecting the restored data to an error correction operation while performing reverse operation to the processing of the encoder to reconstruct input data; and
   a D-A converter for converting the reconstructed data into an analog signal.

29. The video signal recording/reproducing apparatus of claim 27, wherein the first synchronous signal extracting means extracts a timing identical to the timing of the ancillary data of the recording signal recorded on the recording medium through the recording heads, the second synchronous signal extracting means detects the ancillary data from the recording data restored by the demodulation means and extracts reproduction timing of the ancillary data, and the recording phase control means makes reference to the ancillary data extracted by the first and second synchronous signal extracting means as the synchronous signal.

30. The video signal recording/reproducing apparatus of claim 27, wherein the recording signal processing means further includes data compressing means for compressing the input video signal converted into the digital signals by the A-D converter and applying the compressed video signal to the encoder, and the reproducing signal processing means further includes data expanding means for expanding the data reconstructed by the decoder to the data prior to the compression and applying the expanded data to the D-A converter.

* * * * *